(12) United States Patent
Iwasa et al.

(10) Patent No.: US 7,101,826 B2
(45) Date of Patent: Sep. 5, 2006

(54) RECORDING PAPER AND LABEL PAPER USING THE SAME

(75) Inventors: Yasuo Iwasa, Ibaraki (JP); Masaaki Yamanaka, Ibaraki (JP)

(73) Assignee: Yupo Corporation, Tokyo (JP)

( * ) Notice: Subject to any disclaimer, the term of this patent is extended or adjusted under 35 U.S.C. 154(b) by 10 days.

(21) Appl. No.: 10/941,845

(22) Filed: Sep. 16, 2004

(65) Prior Publication Data

US 2005/0048271 A1   Mar. 3, 2005

Related U.S. Application Data

(63) Continuation of application No. PCT/JP03/03459, filed on Mar. 20, 2003.

(30) Foreign Application Priority Data

| Mar. 20, 2002 | (JP) | ................................. 2002-077940 |
| Mar. 20, 2002 | (JP) | ................................. 2002-077941 |
| Mar. 20, 2002 | (JP) | ................................. 2002-077942 |
| Mar. 20, 2002 | (JP) | ................................. 2002-077943 |

(51) Int. Cl.
    *B41M 5/00*    (2006.01)

(52) U.S. Cl. ................... 503/227; 428/195.1; 428/32.5; 430/270.1

(58) Field of Classification Search ............. 428/195.1, 428/32.39, 32.5; 430/270.1; 503/227

See application file for complete search history.

(56) References Cited

U.S. PATENT DOCUMENTS 6,811,837 B1   11/2004   Iwasa et al.

| 2002/0012786 A1 | 1/2002 | Iwasa et al. ............. 428/317.9 |
| 2003/0017321 A1 | 1/2003 | Iwasa et al. |
| 2003/0072935 A1 | 4/2003 | Iwasa et al. |
| 2003/0118790 A1 | 6/2003 | Ilda et al. |

FOREIGN PATENT DOCUMENTS

| EP | 715953 A2 | 6/1996 |
| EP | 845490 A2 | 6/1998 |
| JP | 4-18337 A | 1/1992 |
| JP | 5-491 A | 1/1993 |
| JP | 5-169806 A | 7/1993 |
| JP | 7-53754 A | 2/1995 |
| JP | 9-300831 | 11/1997 |
| JP | 10-258476 A | 9/1998 |
| JP | 11309778 | 11/1999 |

*Primary Examiner*—B. Hamilton Hess
(74) *Attorney, Agent, or Firm*—Oblon, Spivak, McClelland, Maier & Neustadt, P.C.

(57) ABSTRACT

An object of the present invention is to provide recording paper and label paper with excellent waterproof properties, reduced curling from heat when used as recording paper in a heat-fixing type electrophotographic printer, a heat-fixing type electrophotographic copier or a direct heat-sensitive printer, excellent paper delivery properties, and capable of providing continuous printing of multiple sheets. A further object of the invention is to provide recording paper and label paper with excellent waterproof properties as the base materials of masking seals and re-covering-preventing labels, and requiring no special process to start peeling. The present invention provides recording paper comprising resin film (A) containing a thermoplastic resin, and at least one of inorganic fine powder and an organic filler, wherein the heat of crystallization is 60 J/cm$^3$ or lower, and label paper using the same.

24 Claims, No Drawings

RECORDING PAPER AND LABEL PAPER USING THE SAME

TECHNICAL FIELD

The present invention relates to recording paper and label paper applicable to a heat-fixing type electrophotographic printer, a heat-fixing type electrophotographic copier or a direct heat-sensitive printer. The recording paper according to the present invention has excellent waterproof properties as compared with natural paper. Water-proof properties make the recording paper useful as the base materials of indoor and outdoor advertising poster paper, paper for industrial products (cautionary and direction labels), indoor and outdoor advertising stickers, labels for the containers of frozen foods, packing paper, book covers and signboards. By providing a peeling layer, the recording paper according to the invention is also useful as the base materials of delivery slips free of paste, masking seals of a postcard and a passbook, labels for the prevention of re-covering, labels for the prevention of altering, application seals and coupons.

BACKGROUND ART

Coated paper was conventionally used as paper for industrial products, labels on the containers of frozen foods, and indoor and outdoor advertising posters. However, coated paper has poor waterproof properties, and therefore, waterproof resin films comprising polyolefin synthetic paper has more recently been used.

These resin films are well known, and have been disclosed in, JP-B-46-40794 (the term "JP-B" as used herein means an "examined Japanese patent publication"), JP-B-49-1782, JP-A-56-118437 (the term "JP-A" as used herein means an "unexamined published Japanese patent application"), JP-A-57-12642 and JP-A-57-56224.

However, such polyolefin synthetic paper shrinks when heated at 100° C. or higher. Accordingly, during printing with a heat-fixing type electrophotographic printer or a heat-fixing type electrophotographic copier that fixes toner by heat energy, such as plain electrophotographic copier (PPC) or laser beam printer (LBP), excessive curling occurs on the printed face side due to the dimensional change of the resin film during heat fixing. This results in poor paper delivery during the continuous printing of multiple sheets. Therefore, the use of polyolefin synthetic paper has met with limited success. Further, when using a direct heat-sensitive printer in which the temperature of a heat-sensitive head is from 100 to 180° C., the heat curls the paper towards the printed side of the heat-sensitive recording. As a result, paper delivery is poor, and this interferes with the continuous printing of multiple sheets.

For preventing paper curling, laminated recording paper comprising heat resistant pulp paper and polyolefin synthetic paper has also been disclosed (JP-A-62-198497). However, for such a lamination process, a processing manufacturer must purchase raw material from both a film manufacturer and a paper manufacturer. This leads to higher costs for the manufacture of recording paper. Therefore, a low curl recording paper provided from a less expensive process is desirable.

Further, adhesive labels for the prevention of altering, or adhesive labels impossible of re-covering are demanded and these labels have been put to practical use. However, re-covering-preventing adhesive labels are expensive, and there still remain problems of the residual adhesive on the peeled surface and of dust adhesion.

Attempts to solve this problem have been disclosed in JP-A-8-99377 and JP-A-10-258476, but they have drawbacks such as inferior waterproof properties, and special processing techniques, (e.g., notching,) are required to provide easy peeling.

The present invention solves the problems with prior techniques. For example, an object of the present invention is to provide recording paper and label paper with excellent waterproof properties and with less curling by heat while using the recording paper in a heat-fixing type electrophotographic printer, a heat-fixing type electrophotographic copier or a direct heat-sensitive printer, while still providing excellent paper delivery, and the ability to provide continuous printing of multiple sheets.

A further object of the invention is to provide recording paper and label paper with excellent waterproof properties as the base materials of masking seals and re-covering-preventing labels, and requiring no special process to start peeling.

The present invention involves preparing recording paper comprising a resin film (A) containing a thermoplastic resin, and at least one of an inorganic fine powder and an organic filler, and having the heat of crystallization of 60 J/cm$^3$ or lower. The height of curl of the recording paper is reduced after printing while utilizing a heat-fixing type electrophotographic printer, a heat-fixing type electrophotographic copier or a direct heat-sensitive printer. In addition, good printability is realized in the continuous printing of multiple sheets. Further, the recording paper is suitable as recording paper requiring no special process to start peeling by further comprising a layer (C) capable of layer-from-layer peeling having a peeling strength of from 5 to 150 g/cm width, and a surface layer (D) having a breaking strength of 500 g/cm width or less on resin film (A).

The recording paper according to the present invention is characterized in that printing is performed with a heat-fixing type electrophotographic printer, a heat-fixing type electrophotographic copier or a direct heat-sensitive printer, and that the heights of the curls of four corners of A-4 size (210 mm×297 mm) paper after two minutes or more from printing with a heat-fixing type electrophotographic printer, a heat-fixing type electrophotographic copier or a direct heat-sensitive printer are 50 mm or less on average.

In a preferred embodiment of the invention, resin film (A) contains from 35 to 97 wt % of a thermoplastic resin and from 65 to 3 wt % of at least one of an inorganic fine powder and an organic filler, the thermoplastic resin is preferably a crystalline resin, an amorphous resin or an elastomer, or a mixture of two or more thereof, and the thermoplastic resin is more preferably a mixture of a crystalline resin and an amorphous resin, or a mixture of a crystalline resin and an elastomer.

The crystalline resin is an olefin resin, more preferably a propylene resin. The amorphous resin is preferably selected from terpene resins, carboxylic acid vinyl ester resins, acrylic esters, methacrylic esters and petroleum resins, and the elastomer is preferably selected from thermoplastic styrene elastomers, thermoplastic olefin elastomers, thermoplastic urethane elastomers and thermoplastic ester elastomers.

Resin film (A) is preferably at least uniaxially stretched. The porosity of resin film (A) is preferably 75% or less. Resin film (A) preferably has a multilayer structure.

Resin film (A) is preferably subjected to oxidation treatment or provided with image-receiving layer (B). Further, resin film (A) preferably has layer (C) capable of layerfrom-layer peeling having a peeling strength of from 5 to 150 g/cm width, and more preferably a surface layer (D), having a breaking strength of 500 g/cm width or less, is laminated on the surface of layer (C) capable of layer-from-layer peeling.

Layer (C) capable of layer-from-layer peeling can be prepared by a coating process. Electrostatic capacity is preferably 5 pF/cm$^2$ or more.

Resin film (A) can be used as label paper laminated with strippable paper (F) through adhesive layer (E).

Further, the present invention includes recording substances using the recording paper and the label paper, and also includes methods of recording with a heat-fixing type electrophotographic printer, a heat-fixing type electrophotographic copier or a direct heat-sensitive printer.

BEST MODE FOR CARRYING OUT THE INVENTION

The recording paper containing resin film (A) in the invention may be a simple substance comprising resin film (A) alone, or may be a laminate of resin film (A) with other thermoplastic film, or may have a structure comprising resin film (A) having layer (C) capable of layer-from-layer peeling, or layer (C) capable of layer-from-layer peeling and surface layer (D).

The recording paper in the present invention is described below in the order of resin film (A), image-receiving layer (B), layer (C) capable of layer-from-layer peeling, surface layer (D), adhesive layer (E) and strippable paper (F).

(1) Resin Film (A)

The heat of crystallization of the recording paper containing resin film (A) according to the invention is 60 J/cm$^3$ or less, preferably 55 J/cm$^3$ or less, and more preferably 50 J/cm$^3$ or less. When the heat of crystallization exceeds 60 J/cm$^3$, excessive curling occurs after passing through a heat-fixing type electrophotographic printer, a heat-fixing type electrophotographic copier or a direct heat-sensitive printer. The curling causes the recording paper to curve or becomes cylindrical, so that continuous printing of multiple sheets is difficult.

The height of curl on average capable of continuous printing of multiple sheets is 50 mm or lower, preferably 40 mm or lower, more preferably 35 mm or lower, and still more preferably from 0 to 25 mm. When the average height of curl exceeds 50 mm, poor stable paper piling in the paper delivery system occurs after printing and this causes a loss in printing productivity.

The heat of crystallization is measured in conformity with JIS-K-7122. In the present invention, a value obtained by the product of a measured value at a cooling speed of 20° C./min (heat of transition per 1 g (J/g)) and material density (g/cm$^3$) is taken as the heat of crystallization (J/cm$^3$).

Material density is measured in conformity with JIS-K-7112. In the present invention, material density means film density obtained by remelting resin film (A) or recording paper on a heater plate, removing pores and cooling.

The heat of crystallization can be measured, for example, by use of a differential scanning calorimeter (DSC6200, trade name, manufactured by Seiko Instruments Inc.).

It is preferred for resin film (A) in the invention to have a porous structure with micro pores inside the film that provide a reduction in the weight of the film. The porosity is preferably 75% or lower, preferably from 1 to 70%, and more preferably from 5 to 65%. When the porosity is 75% or lower, good material strength of film can be obtained.

The pores present inside a film can be confirmed by observing the cross section of the film with an electron microscope.

The porosity in the invention can be expressed by the following equation, or the proportion of the area (%) accounted for by pores in the observed area of the cross section of the film with an electron microscope. The porosity represented by the following equation (1) is the same as the proportion of the area.

The proportion of the area shown by pores can also be obtained specifically by enclosing resin film (A) with an epoxy resin to solidify resin film (A), preparing a cut surface parallel to the thickness direction and perpendicular to the face direction with a microtome, metallizing the cut surface, and observing the metallized cut surface with a scanning electron microscope by magnifying the cut surface to an easily observable magnification, (e.g. from 500 to 2,000 magnification,) or by taking an electron microscopic image and analyzing the image. As an example of a means of obtaining the area ratio, a drawing is prepared by tracing the porous portions on a tracing film and painting out the traced porous portions, the thus-obtained drawing is subjected to image process with an image analyzer (Model LUZEX IID, manufactured by NIRECO Corporation), and the obtained area proportion of pores (%) can also be taken as the porosity.

$$\text{Porosity } (\%) = 100 \times (\rho_0 - \rho)/\rho_0 \qquad (1)$$

(wherein $\rho_0$: the density of non-porous portion of resin film (A), $\rho$: the density of resin film (A)).

Moreover, when the recording paper in the invention is a laminate having resin film (A) on the surface, the porosity can be obtained by computing the thickness and weight of the resin film from the thicknesses and weights (g/m$^2$) of the laminate and the part of the laminate from which resin film (A) is removed, finding the density ($\rho$) of resin film (A) from the above-obtained thicknesses and weights, finding the density of non-porous portion ($\rho_0$) from the compositions of the constitutional components of the recording paper, and applying these $\rho$ and $\rho_0$ to the above equation.

The heat shrinkage factor after heating at 120° C. for 30 minutes of resin film (A) of the invention is 10% or less on average in the longitudinal and transverse directions, preferably 8% or less, and more preferably 5% or less. When the heat shrinkage factor exceeds 10%, curling after passing through a heat-fixing type electrophotographic printer, a heat-fixing type electrophotographic copier or a direct heat-sensitive printer is great, and the recording paper curves or becomes cylindrical, so that continuous printing of multiple sheets is difficult. The heat shrinkage factor can be obtained by cutting resin film (A) in a prescribed size, e.g., a square of 100 mm square in the longitudinal and transverse directions, measuring the dimension of the cut resin film (A) in an air-conditioned room of 23° C. 50% RH, subjecting resin film (A) to heat treatment in a ventilating oven at 120° C. for 30 minutes, after taking out of the oven, allowing it to be cooled in the same air-conditioned room for one hour, measuring the dimension and comparing with the dimension before heat treatment in the oven.

<Composition>

Each blending amount of a crystalline resin, an amorphous resin, an elastomer, inorganic fine powder and/or an organic filler of resin film (A) in the invention can be independently combined in the following ranges so that the heat of crystallization of the recording paper including resin film (A) becomes 60 J/cm$^3$ or lower.

Resin film (A) in the invention contains from 30 to 100 wt % of a thermoplastic resin, from 70 to 0 wt % of at least one of an inorganic fine powder and an organic filler, preferably from 35 to 97 wt % of a thermoplastic resin, from 65 to 3 wt % of at least one of an inorganic fine powder and an organic filler, and more preferably from 40 to 95 wt % of a thermoplastic resin, from 60 to 5 wt % of at least one of an inorganic fine powder and an organic filler.

The thermoplastic resin may comprise a crystalline resin, an amorphous resin or an elastomer alone, or a mixture of two or more thereof. The thermoplastic resin is preferably a mixture of a crystalline resin and an amorphous resin, or a mixture of a crystalline resin and an elastomer, and more preferably a mixture of a crystalline resin and an elastomer.

The kinds of the thermoplastic resins for use in resin film (A) in the invention are not limited.

The crystalline resin is exemplified by thermoplastic resins such as ethylene resins (e.g., high density polyethylene, low density polyethylene, and linear chain polyethylene), olefin resins (e.g., propylene resins), and polyester resins (e.g., polyethylene terephthalate and copolymers thereof, polyethylene naphthalate, and aliphatic polyester). These exemplified resins may be used as a mixture of two or more.

Of these thermoplastic resins, ethylene resins and olefin resins such as propylene resins are preferred from the viewpoint of chemical resistance, low specific gravity and low cost, and high density polyethylene and propylene resins are more preferred. The propylene resins are exemplified by isotactic polymers obtained by homopolymerization of propylene, and propylene homopolymers, such as syndiotactic polymers and atactic polymers. Copolymers comprising polypropylenes having various stereoregularities as the main components that are obtained by copolymerization of propylene with α-olefins (e.g., ethylene, 1-butene, 1-hexene, 1-heptene, and 4-methyl-1-pentene) can also be used. These copolymers may be binary systems, ternary systems or higher systems, and they may be random copolymers, block copolymers and graft copolymers.

The amorphous resins are exemplified by thermoplastic resins such as terpene resins (e.g., hydrogenated terpene resins and aromatic-modified terpene resins), carboxylic acid vinyl ester resins (e.g., vinyl acetate resins and vinyl stearate resins), (meth)acrylate resins ((meth)acrylate means acrylate and methacrylate), (e.g., acrylate resins, methacrylate resins, methyl(meth)acrylate resins, and ethyl(meth) acrylate resins), polycarbonate; polystyrene resins (e.g., atactic polystyrene and syndiotactic polystyrene), and petroleum resins (e.g., hydrogenated petroleum resins, aliphatic petroleum resins, aromatic petroleum resins, and cyclopentadiene petroleum resins). Of these resins, petroleum resins, such as hydrogenated petroleum resins, aliphatic petroleum resins, aromatic petroleum resins and cyclopentadiene petroleum resins are preferred, and these resins can be used as mixtures of two or more.

The elastomers are exemplified by isoprene rubber, butadiene rubber, 1,2-polybutadiene, styrene-butadiene rubber, chloroprene rubber, nitrile rubber, ethylene-propylene rubber, ethylene-propylene-ethylidenenorbornene rubber, chlorosulfonated polyethylene, acrylic rubber, epichlorohydrin rubber, silicone rubber, fluorine rubber, urethane rubber, and thermoplastic elastomers having both components of incompatible soft segment and hard segment in the molecule.

The thermoplastic elastomers are exemplified by styrene series thermoplastic elastomers (SBC), olefin series thermoplastic elastomers (TPO), urethane series thermoplastic elastomers (TPU), ester series thermoplastic elastomers, vinyl chloride series thermoplastic elastomers, butyl rubber grafted polyethylene, trans-1,4-polyisoprene, and ionomers. Of these thermoplastic elastomers, styrene series thermoplastic elastomers (SBC) and olefin series thermoplastic elastomers (TPO) are preferred, and olefin series thermoplastic elastomers (TPO) are more preferred. These resins can be used as mixtures of two or more.

Resin film (A) in the invention preferably has a porous structure having micro pores inside the film by containing at least one of an inorganic fine powder and an organic filler.

The amount of an inorganic fine powder or an organic filler is from 0 to 70 wt %, preferably from 3 to 65 wt %, and more preferably from 5 to 60 wt %. The more the amount of at least one of an inorganic fine powder or organic filler, the more the increase in pores, but the amount is preferably 70 wt % or less for the purpose of the improvement of the surface property of resin film (A).

The kinds of inorganic fine powders or organic fillers are not particularly limited.

Examples of the inorganic fine powders include composite inorganic fine powders having an aluminum oxide or hydroxide around the nucleus of hydroxyl group-containing an inorganic fine powder such as heavy calcium carbonate, precipitated calcium carbonate, calcined clay, talc, titanium oxide, barium sulfate, aluminum sulfate, silica, zinc oxide, magnesium oxide, diatomaceous earth, silicon oxide, and silica, and hollow glass beads. Further, these inorganic fine powders are exemplified by subjecting them to a surface treatment with various kinds of surface treating agents. The surface treating agents are preferably exemplified by resin acids, fatty acids, organic acids, sulfuric ester series anionic surfactants, sulfonic acid series anionic surfactants, petroleum resin acids, salts thereof (e.g., with sodium, potassium or ammonium), fatty acid esters, resinate, wax and paraffin. Nonionic surfactants, diene polymers, titanate coupling agents, silane coupling agents and phosphoric acid coupling agents are also preferred.

The sulfuric ester series anionic surfactants are exemplified by long chain alcohol sulfate, polyoxyethylene alkyl ether sulfate, sulfated oil, and salts thereof (e.g., with sodium or potassium,) and the sulfonic acid series anionic surfactants are exemplified by alkylbenzenesulfonic acid, alkylnaphthalenesulfonic acid, alkanesulfonic acid, paraffin sulfonic acid, α-olefin sulfonic acid, alkylsulfosuccinic acid, and salts thereof (e.g., with sodium or potassium).

The fatty acids are exemplified by caproic acid, caprylic acid, pelargonic acid, capric acid, undecanoic acid, lauric acid, myristic acid, palmitic acid, stearic acid, behenic acid, oleic acid, linoleic acid, linolenic acid, and eleostearic acid, the organic acids are exemplified by carboxylic acid and sulfonic acid, and as the nonionic surfactants are exemplified by, polyethylene glycol ester series surfactants. These surface treating agents can be used alone, or they may be used in combination of two or more.

Heavy calcium carbonate, clay and diatomaceous earth are inexpensive and preferably used in forming films by stretching to create good pore formation.

Organic fillers are selected from resins having a melting point or a glass transition point higher than that of the above thermoplastic resins and incompatible with the above thermoplastic resins for the purpose of forming pores. Specific examples of organic fillers include polyethylene terephthalate, polybutylene terephthalate, polyamide, polycarbonate, polyethylene naphthalate, polystyrene, polymers and copolymers of acrylate and methacrylate, melamine resin, polyphenylene sulfite, polyimide, polyale ether ketone, polyphenylene sulfide, homopolymers of cyclic olefin, and copolymers of cyclic olefin and ethylene (cyclic olefin copolymer (COC)). Of these organic fillers, in the case where olefin resin is used as the thermoplastic resin of resin film (A), those selected from polyethylene terephthalate, polybutylene terephthalate, polyamide, polycarbonate, polyethylene naphthalate, polystyrene, homopolymers of cyclic olefin, and copolymers of cyclic olefin and ethylene are preferred.

Of inorganic fine powders and organic fillers, inorganic fine powders are preferred to organic fillers from the point that the quantity of heat generated at burning is less.

The average particle size of inorganic fine powders or the average dispersion particle size of organic fillers for use in the invention is preferably from 0.01 to 30 μm, more preferably from 0.1 to 20 μm, and still more preferably from 0.5 to 15 μm. The average particle size is preferably 0.1 μm or more for ease of mixing with a thermoplastic resin. The average particle size is also preferably 20 μm or less to avoid sheet breaks during stretching and a reduction in surface layer strength in the case where pores are generated inside the sheet by stretching to thereby improve printability.

The average particle size of inorganic fine powders for use in the invention can be measured, as one example, by the particle sizes corresponding to 50% of particle sizes in accumulation (cumulative 50% particle size) measured with a particle measuring apparatus (e.g., a laser analysis type particle measuring apparatus "Microtrack" (trade name, manufactured by NIKKISO Co., Ltd.)). The particle size of an organic filler dispersed in a thermoplastic resin by hot melt kneading and dispersion can also be obtained as the average value of particle sizes by measuring at least 10 particles from the observation of the cross section of resin film (A) with an electron microscope.

The fine powder for use in resin film (A) in the invention may be used by selecting one type alone from the above fine powders or may be used in combination by selecting two or more types. When two or more types are used in combination, inorganic fine powders and organic fillers may be combined.

In blending and kneading these fine powders in a thermoplastic resin, if necessary, an antioxidant, an ultraviolet stabilizer, a dispersant, a lubricant, a compatibilizer, a flame retardant and a color pigment can be added to the thermoplastic resin. Further, when resin film (A) of the invention is used as a durable material, it is preferred to add an antioxidant and an ultraviolet stabilizer to resin film (A). When an antioxidant is added, the amount is generally from 0.001 to 1 wt %. Specifically, steric hindrance phenol series, phosphorus series and amine series stabilizers can be used. When an ultraviolet stabilizer is used, the amount is generally from 0.001 to 1 wt %. Specifically, steric hindrance amine, benzotriazole series and benzophenone series stabilizers can be used.

A dispersant and a lubricant are used for the purpose of dispersing inorganic fine powders. The addition amount is generally from 0.01 to 4 wt %. Specifically, a silane coupling agent, higher fatty acids (e.g., oleic acid and stearic acid), metal soap, polyacrylic acid, polymethacrylic acid, and salts thereof can be used for this purpose. Further, when organic fillers are used, the type and addition amount of a compatibilizer are important, since these determine the particle form of the organic filler. The preferred compatibilizers for organic fillers are exemplified by epoxy-modified polyolefins and maleic acid-modified polyolefins. The addition amount of compatibilizers is preferably from 0.05 to 10 weight parts per 100 weight parts of the organic fillers.

The constitutional components of resin film (A) in the invention can be mixed by various well-known methods with no limitation, and the temperature and time of mixing can also be independently adjusted to the states and properties of the components to be used. Mixing methods are exemplified by dissolved state mixing or dispersing the components in a solvent and hot melt kneading. Hot melt kneading provides excellent in production efficiency. A method of blending a thermoplastic resin, inorganic fine powder, an organic filler and a dispersant in a state of powder or pellets with a Henschel mixer, a ribbon blender or a super mixer, melt-kneading the components with a biaxial kneading-extruder, and extruding the contents in strands, and cutting the strands to make pellets, and a method of extruding the kneaded product from a strand die into water, and cutting the extruded product with rotary knives mounted on the top of the die can also be used. In addition, a method of once blending a dispersant in a powdery or liquid state or being dissolved in water or an organic solvent with inorganic fine powder or an organic filler, and then further blending the above mixture with other component (e.g., a thermoplastic resin,) can also be exemplified.

The thickness of resin film (A) in the invention is not limited. For example, the thickness of resin film (A) may be from 10 to 500 μm, and preferably from 30 to 300 μm.

Resin film (A) in the invention may comprise a single layer or two-layer structure, or may have a multilayer structure comprising three or more layers. Resin film (A) in the invention may be or may not be stretched, but it is preferred that resin film (A) be stretched at least in a uniaxial direction for various advantages that the weight of the film can be reduced by forming pores inside the film and a flexible film can be formed by stretching.

When the multilayer structure film is subjected to stretching, the axial number of stretching may be uniaxial/uniaxial, uniaxial/biaxial, biaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial or biaxial/biaxial/biaxial. By making resin film (A) multilayer structure, the addition of a variety of functions, such as writing property, printability, heat transfer aptitude, scratch resistance and secondary processing aptitude becomes possible.

The recording paper in the invention may comprise resin film (A) having been laminated on at least one side of other thermoplastic film, laminate paper, pulp paper, nonwoven fabric, fabric, a wooden sheet or a metal sheet. Other thermoplastic film to be laminated thereon can include transparent and opaque films such as a polyester film, a polyamide film, a polystyrene film and a polyolefin film.

The heat of crystallization of the recording paper comprising a laminate is 60 J/cm$^3$ or lower, preferably 55 J/cm$^3$ or lower, and more preferably 50 J/cm$^3$ or lower.

The thickness of a laminate is not limited and can be independently selected according to purposes, with a range of from 15 to 2,000 μm, preferably from 35 to 1,000 μm, and more preferably from 50 to 500 μm.

<Manufacturing Method>

Resin film (A) in the invention can be manufactured by combining various methods well known in the industry. Any electrophotographic film manufactured by any method can be included in the scope of the present invention so long as the recording paper satisfying the condition of the invention is used.

As the manufacturing method of resin film (A) in the invention, various well-known film-forming techniques and combinations thereof can be used. Examples include, a cast forming method of extruding a molten resin in a sheet with single layer or multilayer T die connected to a screw type extruder, a stretching film method of utilizing the pore generation by stretching, a calendering method and a calender forming method of generating pores in calendering, a foaming method of using a foaming agent, a method of using particles containing pores, an inflation forming method, a solvent extraction method, and a method of melting and extracting mixed components. Of these methods, a stretching film method is preferred.

Stretching includes not only resin film (A) of the invention but other layers as well. For example, when final recording paper to be manufactured is a laminate comprising resin film (A) formed thereon the later-described layer (C) capable of layer-from-layer peeling and surface layer (D), after laminating resin film (A), layer (C) capable of layer-from-layer peeling and surface layer (D), these layers may be stretched all together. When these layers are laminated in advance and then stretched collectively, the operations can be done simply at low cost as compared with the case where each layer is stretched individually and then laminated. Further, pores formed in resin film (A), layer (C) capable of layer-from-layer peeling and surface layer (D) can be more easily controlled.

Films can be stretched by various well-known methods. In the case where a thermoplastic resin is an amorphous resin, the temperature of stretching is higher than the glass transition temperature of the thermoplastic resin to be used, and in the case of a crystalline resin, stretching can be done in a preferred temperature range for the thermoplastic resin of higher than the glass transition temperature of the non-crystal part and lower than the melting point of the crystal part. Specific examples include, vertical stretching making use of the difference in peripheral velocities of rolls, transverse stretching using a tenter oven, calendering, inflation stretching using a mandrel for a tubular film, and coincident biaxial stretching by the combination of a tenter oven and a linear motor.

Magnification of stretching is not particularly limited and it is independently determined by considering the use purpose of recording paper and the characteristics of the thermoplastic resins to be used. For example, when a propylene homopolymer or a copolymer thereof is used as the thermoplastic resin, magnification is from 1.2 to 12 times, preferably from 2 to 10 times, in the case of uniaxial stretching, and magnification is from 1.5 to 60 times, preferably from 10 to 50 times, in area magnification in the case of biaxial stretching. When other thermoplastic resins are used, from 1.2 to 10 times, preferably from 2 to 7 times, in the case of uniaxial stretching, and from 1.5 to 20 times, preferably from 4 to 12 times, in area magnification in the case of biaxial stretching.

Further, if necessary, resins may be subjected to heat treatment at high temperature. The temperature of stretching is lower than the melting point of the thermoplastic resin to be used by 2 to 160° C. When a propylene homopolymer or a copolymer thereof is used as the thermoplastic resin, the temperature of stretching is preferably lower than the melting point of the homopolymer or copolymer by 2 to 60° C., and stretching speed is preferably from 20 to 350 m/min.

Films obtained in this manner have a great number of micro pores inside the films in porosity computed by the above equation (1) of 75% or less, preferably from 1 to 70%, and more preferably from 5 to 65%. By the presence of pores, the films are more flexible as compared with stretched films not having micro pores.

It is preferred that at least one side of resin film (A) be subjected to surface treatment for the purpose of the improvement of adhesion of resin film (A) and image-receiving layer (B) and coating property.

The surface treatment method is exemplified by surface oxidation treatment and treatment with a surface treatment agent. Surface oxidation and treatment with a surface treatment agent in combination is preferred.

Specific examples of surface oxidation treatment include corona discharge treatment, flame treatment, plasma treatment, glow discharge treatment and ozone treatment with corona discharge treatment and flame treatment being preferred, and corona discharge treatment being more preferred.

The dose of corona discharge treatment is from 600 to 12,000 J/m$^2$ (from 10 to 200 W·min/m$^2$), preferably from 1,200 to 9,000 J/m$^2$ (from 20 to 180 W·min/m$^2$). Sufficient corona discharge treatment is obtained by a dose of 600 J/m$^2$ (10 W·min/m$^2$) or more, while with a dose of 12,000 or more J/m$^2$ (200 W·min/m$^2$), no further effect can be obtained, so that the dose of 12,000 J/m$^2$ (200 W·min/m$^2$) or less is sufficient. In the case of flame treatment, the dose is from 8,000 to 200,000 J/m$^2$, preferably from 20,000 to 100,000 J/m$^2$. For obtaining a sufficient treatment effect, the dose is 8,000 J/m$^2$ or more, while with a dose of more than 200,000 J/m$^2$, no further effect of treatment is obtained, so that the dose of 200,000 J/m$^2$ or less is sufficient.

As the surface treatment agent, one or mixtures of two or more selected from the following materials can be used. It is particularly preferred to use a surface treatment agent combined with a primer as the main component to increase the adhesion of resin film (A) and image-receiving layer (B). Specific examples of primers include water-soluble primers selected from the group consisting of polyethyleneimine, butylated polyethyleneimine, hydroxypropylated polyethyleneimine, hydroxyethylated polyethyleneimine, 2,3-dihydroxypropylated polyethyleneimine, poly (ethyleneimine-urea), ethyleneimine adducts of polyaminepolyamide, epichlorohydrin adducts of polyaminepolyamide, acrylic emulsions, and tertiary or quaternary nitrogen-containing acrylate resins.

The method of forming a surface treated layer by these surface treatments is not limited. For example, a surface treated layer can be formed with a roll coater, a blade coater, a bar coater, an air knife coater, a size spray coater, a gravure coater, a reverse coater, a die coater, a lip coater or a spray coater. If necessary, smoothing is performed, and then excessive water and a hydrophilic solvent are removed by drying, thus a surface treated layer can be formed.

When resin film (A) is a stretched film, a surface treatment agent may be coated any time before and after vertical or transverse stretching, and coating process may be performed through a single stage or multi-stages.

Image-Receiving Layer (B):

It is preferred to provide image-receiving layer (B) on the printing surface side of resin film (A) in the invention for the purpose of improving the reproducibility of images and letters. As image-receiving layer (B), it is preferred to provide toner-receiving layer (B1) comprising inorganic and/or organic pigments and a binder, or heat-sensitive recording layer (B2) containing polyester series, acrylic series or polyurethane series organic substance.

Toner-Receiving Layer (B1):

As toner-receiving layer (B1), resins, such as acrylic acid resins, polyester resins, urethane resins, vinyl acetate copolymers and maleic acid copolymers are used as the binder, and silica, talc, titanium oxide, heavy calcium carbonate and precipitated calcium carbonate are exemplified as the inorganic pigments. If necessary, further various materials can be added to toner-receiving layer (B1). Materials to be added to toner-receiving layer (B1) can be independently selected from among materials generally used in toner-receiving layer (B1). For example, a hardener, an ultraviolet absorber and a surfactant can be used, but the amounts of these materials have to be in the range as to not hinder the waterproof property and weatherproof property of toner-receiving layer (B1).

The producing method of toner-receiving layer (B1) is not limited. Examples include a dry lamination method, an extrusion lamination method, a wet lamination method and a coating method. Of these methods, a coating method is preferred. Each component constituting toner-receiving layer (B1) is dispersed in a non-aqueous solvent comprising alone or in combination of toluene, ethyl acetate, methyl ethyl ketone or isopropyl alcohol, and the dispersion is diluted, thereby a coating solution of toner-receiving layer (B1) is prepared. Moreover, each component may be dispersed in a diluted solvent containing water as the main component in the range capable of maintaining the waterproof property of toner-receiving layer (B1), and if necessary in combination with methanol or ethanol, and the solution is diluted to thereby prepare a coating solution. The concentration of the solid content of the prepared coating solution is generally from 10 to 60 wt %, preferably from 15 to 50 wt %. When the concentration is less than 10 wt %, it is sometimes not economical, since the evaporation of the diluted solvent requires energy. While when the concentration exceeds 60 wt %, coating aptitude is liable to lower.

The coating method of toner-receiving layer (B1) is not limited. For example, coating can be done with a roll coater, a blade coater, a bar coater, an air knife coater, a gravure coater, a reverse coater, a die coater, a lip coater, a spray coater or a size spray coater. After coating process, smoothing is performed if necessary, and then excessive solvent is removed by drying, thus a toner-receiving layer is formed. The coating amount of a coating solution is from 0.005 to 35 $g/m^2$ as the solid content after drying, preferably from 0.01 to 20 $g/m^2$. When the coating amount exceeds 35 $g/m^2$ production costs become uneconomical.

Heat-Sensitive Recording Layer (B2):

A color coupler and a developer are contained in heat-sensitive recording layer (B2), and any combination of a color coupler and a developer can be used so long as the combination causes a coloring reaction by the contact of the color coupler and the developer. Examples include a combination of a colorless or light color basic dye and an inorganic or organic acid material, and a combination of higher fatty acid metal salt (e.g., ferric stearate,) and phenols, (e.g., gallic acid). A combination of a diazonium salt compound, a coupler and a basic material can also be used. The diazonium salt compound may be contained in a microcapsule having a shell of polyurea, urethane or gelatin.

The production method of heat-sensitive recording layer (B2) is not limited. For example, a dry lamination method, an extrusion lamination method, a wet lamination method and a coating method are exemplified. Of these methods, a coating method is preferred, and the coating methods of heat-sensitive recording layer (B2) include, for example, a roll coater, a blade coater, a bar coater, an air knife coater, a gravure coater, a reverse coater, a die coater, a lip coater, a spray coater, a blade coater, a comma coater, size press and gate roll. The coating amount of heat-sensitive recording layer (B2) is also not limited, and the amount is generally from 0.1 to 30 $g/m^2$ in dry weight, preferably from 0.2 to 10 $g/m^2$. If necessary, various well-known techniques in the manufacturing field of heat-sensitive recording media can be applied to the invention. An example includes providing an overcoat layer for the purpose of protecting heat-sensitive recording layer (B2).

Layer (C) Capable of Layer-from-Layer Peeling:

In the recording paper in the invention, resin film (A) may be provided with layer (C) capable of layer-from-layer peeling, or layer (C) capable of layer-from-layer peeling and surface layer (D).

Layer (C) capable of layer-from-layer peeling in the invention has weaker strength than the resin film (A) and surface layer (D), and peeling of surface layer (D) is done by breaking of layer (C) capable of layer-from-layer peeling.

Layer (C) capable of layer-from-layer peeling is preferably a thermoplastic resin stretched film containing from 10 to 80 wt %, preferably from 15 to 70 wt %, of at least one of inorganic fine powder and an organic filler, and from 90 to 20 wt %, preferably from 85 to 30 wt %, of a thermoplastic resin, or layer (C) capable of layer-from-layer peeling can be provided by coating a binder resin containing from 10 to 80 wt %, preferably from 15 to 70 wt %, of at least one of inorganic fine powder and an organic filler, and from 90 to 20 wt %, preferably from 85 to 30 wt %, of a thermoplastic resin. When the amount of at least one of inorganic fine powder and an organic filler of layer (C) capable of layer-from-layer peeling is less than 10 wt %, a sufficient peeling property cannot be obtained, while when the amount exceeds 80 wt %, forming stability is impaired.

As the thermoplastic resins in layer (C) capable of layer-from-layer peeling, the thermoplastic resins exemplified in resin film (A) can be used, and it is also preferred to use polyolefin resins similarly to resin film (A). As the binder resins, acrylate resins and chlorinated polypropylene resins are used. As the inorganic fine powders and/or organic fillers, the same as those described in resin film (A) can be used.

The thickness of layer (C) capable of layer-from-layer peeling is from 0.1 to 500 μm, preferably from 0.2 to 200 μm, and more preferably from 0.5 to 100 μm. When the thickness is less than 0.1 μm, a sufficient peeling property cannot be obtained, while when the thickness is greater than 500 μm, a peeled surface becomes uneven, which causes printing failure when printing is performed on the peeled surface.

When layer (C) capable of layer-from-layer peeling is a layer of a stretched resin film, it is possible to obtain a thin and uniform layer (C) capable of layer-from-layer peeling. Further, by stretching layer (C) capable of layer-from-layer peeling containing at least one of inorganic fine powder and an organic filler, it becomes possible to form micro pores in layer (C) capable of layer-from-layer peeling which reduces strength, thereby the peeling strength of surface layer (D) described below can be obtained.

Surface Layer (D):

Surface layer (D) of the invention is a layer provided so as to peel off resin film (A) by the breaking of layer (C) capable of layer-from-layer peeling.

The thermoplastic resins constituting surface layer (D), can be the same thermoplastic resins as described in resin film (A). The polyolefin resins similarly to resin film (A) are preferred. Further, to make the breaking strength of surface layer (D) 500 g/cm or less that is an object of the invention, it is preferred that the thermoplastic resins for use in surface layer (D) have a low breaking strength, and ethylene resins, propylene resins, ethylene-unsaturated carboxylic acid copolymers and ethylene-acrylic acid copolymers are specifically exemplified as such thermoplastic resins.

Surface layer (D) is a layer that may contain or may not contain at least one of an inorganic fine powder and an organic filler, and when at least one of inorganic fine powder and an organic filler is not contained or the content is low, surface layer (D) can have excellent transparency and is excellent in recognizing property of the data under surface layer (D) when resin film (A) is peeled off.

Surface layer (D) is preferably a layer of stretched resin film, and it becomes possible to obtain surface layer (D) thin and uniform in thickness by stretch forming.

The thickness of surface layer (D) is 20 µm or less, preferably from 0.1 to 10 µm, and more preferably from 0.5 to 6 µm. When the thickness exceeds 20 m, it is difficult to obtain a surface layer (D) having the optimum breaking strength.

When resin film (A) has layer (C) capable of layer-from-layer peeling, or layer (C) capable of layer-from-layer peeling and surface layer (D), the heat of crystallization of the obtained recording paper is 60 J/cm$^3$ or lower, preferably 55 J/cm$^3$ or lower, and more preferably 50 J/cm$^3$ or lower.

<Electrostatic Capacity>

The electrostatic capacity of the recording paper in the present invention is 5 pF/cm$^2$ or more per unit electrode area, preferably from 6 to 1,000 pF/cm$^2$, and more preferably from 8 to 800 pF/cm$^2$. When the electrostatic capacity is less than 5 pF/cm$^2$, the transfer rate of toner during printing is reduced while utilizing a heat-fixing type electrophotographic printer, and sufficient printing density cannot be obtained. When the electrostatic capacity exceeds 1,000 pF/cm$^2$, the electric charge applied for the purpose of transferring toner to the recording paper in the printer remains on the recording paper, and as a result the recording paper sticks to recording paper on the paper delivery tray which in turn causes paper blocking. Further, for obtaining electrostatic capacity exceeding 1,000 pF/cm$^2$, it is necessary to add a great amount of electrostatic capacity modifier to the recording paper, and as a result the manufacturing costs are liable to increase. In the measurement of the electrostatic capacity of the recording paper in the invention, "4192ALF IMPEDANCE ANALYZER" (trade name, manufactured by HEWLETTPACKARD) was used. In the atmosphere of 23° C. 50% RH, a sample greater than the diameter of electrode was inserted between an application electrode having a diameter of 38 mm and a guard electrode, voltage of 5 V was applied, and the electrostatic capacity was measured in the frequency band of from 10 Hz to 1 MHz, and a value measured in the frequency of 300 Hz was taken as the representative value.

<Peeling Strength>

After a lamination film comprising resin film (A) provided thereon layer (C) capable of layer-from-layer peeling and surface layer (D) was stored in a thermostatic chamber (20° C. 65% RH) for 12 hours, an adhesive tape (Cello-Tape, trade name, manufactured by Nichiban Co., Ltd.) was stuck on surface layer (D), and the lamination film was cut out to 10 mm broad and 100 mm long. Resin film (A) and surface layer (D) of the cut lamination film were peeled off at a pull rate of 300 mm/min and an angle of 180° with a tensile tester (AUTOGRAPH, manufactured by Shimadzu Corporation). The stress of the time when peeling was stable was measured with a load cell, and the average value in the transverse direction and the longitudinal direction was taken as the peeling strength. The peeling strength of layer (C) capable of layer-from-layer peeling in the invention is from 5 to 150 g/cm, and preferably from 7 to 100 g/cm. When the peeling strength is less than 5 g/cm, there are deleterious effects to printing and cutting because peeling easily occurs in the feeding and delivering of paper in the secondary processing (e.g., printing and cutting). While when the peeling strength exceeds 150 g/cm, surface layer (D) does not peel off and the stress required in peeling becomes impractical. Further, breaking of the material occurs at the place other than layer (C) capable of layer-from-layer peeling, and fluffing occurs on the peeled surface.

<Breaking Strength>

After a lamination film comprising resin film (A), layer (C) capable of layer-from-layer peeling and surface layer (D) was stored in a thermostatic chamber (20° C. 65% RH) for 12 hours, the lamination film was cut out to 10 mm broad and 100 mm long, and the half of the longitudinal direction of surface layer (D) side of the cut out lamination film was reinforced with an adhesive tape (Cello-Tape, trade name, manufactured by Nichiban Co., Ltd.). A sample for measuring breaking strength was produced by peeling surface layer (D) of the part reinforced with an adhesive tape from resin film (A) by hand. The part of the produced sample where surface layer (D) was not peeled and peeled surface layer (D) were set on a tensile tester (AUTOGRAPH, manufactured by Shimadzu Corporation), and a load at the time of breaking surface layer (D) at a pull rate of 300 mm/min was measured. The average value in the transverse and longitudinal directions was taken as breaking strength.

The breaking strength of surface layer (D) in the invention is 500 g/cm or less, preferably 400 g/cm or less, and more preferably 300 g/cm or less. When the breaking strength of surface layer (D) is higher than 500 g/cm, a special process (e.g., providing a notch or a slit on only surface layer (D)), is necessary to peel surface layer (D) from resin film (A), and this yields an unsatisfactory product.

Adhesive Layer (E):

The kind and thickness (a coating amount) of adhesive layer (E) provided on one side of recording paper including resin film (A) can be selected according to need to the type of adherent, the environment to be used, and the strength of adhesion.

Examples of aqueous or solvent series adhesives include, rubber series adhesives, acrylic series adhesives and silicone series adhesives. The specific examples of rubber series adhesives include polyisobutylene rubber, butyl rubber and mixtures of these, and adhesives obtained by blending a tackifier such as an abietic acid rosin ester, a terpene-phenol copolymer, or a terpene-indene copolymer to these rubber series adhesives. The specific examples of acrylic series adhesives include those having a glass transition point of −20° C. or lower. Examples include 2-ethylhexyl acrylate.n-butyl acrylate copolymer and 2-ethylhexyl acrylate ethyl acrylate.methyl methacrylate copolymers. These synthetic polymer adhesives can be used as an organic solvent solution, or in the form dispersed in water, such as dispersion and emulsion.

It is also possible to use adhesive layer (E) containing a pigment, (e.g., titanium white) in the adhesive to improve the opacity of labels.

Adhesive layer (E) can be formed by coating on the surfaces of recording paper and the later-described strippable paper (F) to be laminated in the state of a solution. Coating can be done with a roll coater, a blade coater, a bar coater, an air knife coater, a gravure coater, a reverse coater, a die coater, a lip coater, a spray coater or a comma coater. After the coating process, smoothing is performed if necessary, and adhesive layer (E) is formed by drying.

Adhesive layer (E) is generally formed by the method of coating an adhesive on the later-described strippable paper (F), and drying if necessary, to thereby form adhesive layer (E) on strippable paper (F), and recording layer is laminated thereon. However, adhesive layer (E) can be formed by directly coating an adhesive on recording paper in some cases.

The coating amount of an adhesive is not limited, and is generally from 3 to 60 g/m², preferably from 10 to 40 g/m² in a solid content.

Strippable Paper (F):

Strippable paper (F) is provided on recording paper containing resin film (A) with adhesive layer (E) in between. In adhering a label paper, the side of strippable paper (F) that is brought into contact with adhesive layer (E) is generally subjected to silicon treatment for improving the peeling properties from adhesive layer (E).

As strippable paper (F), generally recycled paper can be used and in addition wood free paper and kraft paper can be used as is. The paper can be subjected to calendering treatment, coated with a resin, or laminated with a film. In addition, glassine paper, coated paper and plastic film subjected to silicon treatment can be used.

Label paper comprising the constitution of recording paper containing resin film (A)/adhesive layer (E)/strippable paper (F) can be made in this manner.

<Curling after Printing with Heat-Fixing Type Electrophotographic Printer or Heat-Fixing Type Electrophotographic Copier>

When the recording paper in the invention is cut to A-4 size (210 mm×297 mm) and printing is performed with a heat-fixing type electrophotographic printer or a heat-fixing type electrophotographic copier, it is preferred that the heights of the curls of four corners of the paper after two minutes or more after printing are 50 mm or less on average. In a heat-fixing type, a fixing method of using a heat roll or a heat belt is customary.

In further detail, the recording paper is cut to A-4 size (210 mm×297 mm), allowed to stand in an air-conditioned room of 23° C. 50% RH for a day, and printing is performed through the paper-feeding route with recording paper or toner-receiving layer (B) as printing surface by a commercially available heat roll fixing type electrophotographic printer (LASER SHOT LBP-950, trade name, manufactured by Canon Inc.). As the printing test model figure, a pattern comprising a mixture of polychrome and monochrome is selected. After passing through the printer, the recording paper is allowed to stand on a flat table at 23° C. 50% RH with the curls of four corners two minutes after passing through the printer pointing upward. The average value of the heights of four corners is measured with the time when the corners lift in the direction of the printed surface side being taken as plus and the time when they lift in the opposite direction to the printed surface side being taken as minus. The average value is preferably 50 mm or less. When the average value exceeds 50 mm, continuous printing of multiple sheets is difficult.

<Curling after Printing with a Direct Heat-Sensitive Printer>

When the recording paper in the invention is cut to A-4 size (210 mm×297 mm) and printing is performed with a direct heat-sensitive printer, it is preferred that the heights of the curls of four corners of the paper after two minutes or more from printing are 50 mm or less on average.

In further detail, the recording paper is cut to A-4 size (210 mm×297 mm), allowed to stand in an air-conditioned room of 23° C. 50% RH for a day, and printing is performed through the paper-feeding route with image-receiving layer (B) as printing surface by a commercially available direct heat-sensitive printer ("MULTISCAN VIDEO PRINTER UP-930" trade name, manufactured by Sony Corporation).

As the printing test model figure, a pattern of black solid is selected. After passing through the printer, the heat-sensitive recording paper is allowed to stand on a flat table at 23° C. 50% RH with the curls of four corners two minutes after passing through the printer pointing upward. The average value of the heights of four corners is measured with the time when the corners lift in the direction of the printed surface side being taken as plus and the time when they lift in the opposite direction to the printed surface side being taken as minus. The average value is preferably 50 mm or less. When the average value exceeds 50 mm, continuous printing of multiple sheets is difficult.

<Printing>

The recording paper according to the invention can of course be used not only as resin films for heat-fixing type electrophotographic printing, a heat-fixing type electrophotographic copier, as heat-sensitive recording paper and label paper for a direct heat-sensitive printer (e.g., a thermal facsimile, a video printer and a bar code printer), but also for the printing of the name of goods, a manufacturer, the time limit of a taste, the picture of a character, a blank to be entered and a bar code by relief printing, gravure printing, flexographic printing, solvent system offset printing, and UV-curable type offset printing, in the form of a sheet, or in the form of a roll by rotary printing. Further, recorded products printed with these objects can be formed.

If necessary, recorded products can be formed by providing a coating layer (e.g., an ink jet-receiving layer), on the front and rear surfaces of recording paper, and printing by ink jet recording and the like.

Such printing may be performed in the state of resin film (A) or a laminate alone, or in the states of recording paper having adhesive layer/strippable paper, and pressure sensitive adhesive layer/strippable paper.

EXAMPLE

The present invention is described further specifically with reference to Examples and Comparative Examples. The materials, use amounts, ratios and operations shown below can be independently modified without departing from the spirit and scope of the invention. Accordingly, the present invention is by no means limited to the specific examples shown below.

Recording paper and label paper in the present invention were manufactured according to the following procedure. The thermoplastic resins, inorganic fine powders and organic fillers used in the manufacture are shown in Table 1 below.

TABLE 1

| Blending Components | Kinds | Contents | Heat of Transition (J/g) | Density (g/cm³) |
|---|---|---|---|---|
| Thermoplastic Resin | Propylene homopolymer (PP) | Novatech PP: MA3 (trade name, manufactured by Nippon Polychem Co.), (MFR (230° C., 2.16 kg load) = 11 g/10 min) | 94 | 0.9 |
| | Olefin elastomer (TPO) | Zelas 5053 (trade name, manufactured by Mitsubishi Chemical Corporation), (MFR (230° C., 2.16 kg load) = 5 g/10 min) | 45 | 0.9 |

TABLE 1-continued

| Blending Components | Kinds | Contents | Heat of Transition (J/g) | Density (g/cm³) |
|---|---|---|---|---|
| | Hydrogenated styrene-butadiene rubber (HSBR) | DYNARON 1321P (trade name, manufactured by JSR Corporation), (MFR (230° C., 2.16 kg load) = 10 g/10 min) | 0 | 0.9 |
| | High density polyethylene (HDPE) | Novatech HD: HJ360 (trade name, manufactured by Nippon Polychem Co.), (MFR (190° C., 2.16 kg load) = 5.5 g/10 min) | 190 | 1.0 |
| | Low density polyethylene (LDPE) | Novatech LD: LF420M (trade name, manufactured by Nippon Polychem Co.), (MFR (190° C., 2.16 kg load) = 2.2 g/10 min) | 100 | 0.9 |
| | Ethylene vinyl acetate copolymer (EVA) | Novatech EVA: LV440 (trade name, manufactured by Nippon Polychem Co.), (MFR (190° C., 2.16 kg load) = 2.2 g/10 min) | 80 | 0.9 |
| Inorganic Fine Powder | Calcium carbonate (A) | Heavy calcium carbonate having an average particle size of 1.8 μm, specific surface area of 12,000 cm²/g, Softon 1200 (trade name, manufactured by Bihoku Funka Kogyo Co., Ltd.) | 0 | 2.7 |
| | Surface-treated calcium carbonate (B) | Surface-treated calcium carbonate by adding 50 weight parts of a 2% aqueous solution of Anstex SAS (trade name, manufactured by Toho Chemical Industry Co., Ltd., a mixture of sodium alkanesulfonate having 14 carbon atoms and sodium alkanesulfonate having 16 carbon atoms) per 100 weight parts of carcium carbonate (A) | 0 | 2.7 |
| | Calcium carbonate (C) | Heavy calcium carbonate having an average particle size of 1.5 μm, specific surface area of 15,000 cm²/g, Softon 1500 (trade name, manufactured by Bihoku Funka Kogyo Co., Ltd.) | 0 | 2.7 |
| Organic filler | Polybutylene terephthalate resin (PBT) | NOVADUR 5010 (trade name, manufactured by Mitsubishi Chemical Corporation) | 42 | 1.3 |

Example 1

Resin Film (A)

Composition [1] obtained by blending 30 wt % of calcium carbonate A (shown in Table 1) with a mixture comprising 29 wt % of PP (shown in Table 1) and 41 wt % of TPO (shown in Table 1) was kneaded with an extruder set at 250° C., extruded in the state of strands, and cut to prepare pellets. Composition [1] was extruded in the state of a film from T die connected to the extruder set at 250° C., and cooled by a cooling unit, thereby non-stretched film was obtained (thickness: 150 μm, heat of crystallization: 46 J/cm³).

Both surfaces of the film were subjected to corona discharge treatment at applied energy density of 90 W·min/m².

In hot melt kneading of resin component or a mixture of resin component and fine powder in each example and comparative example, the total weight of resin component and fine powder was 100 weight parts, and thereto were added 0.2 weight part of BHT (4-methyl-2,6-di-t-butylphenol) as the antioxidant, and 0.1 weight part of Irganox 1010 (phenol series antioxidant, trade name, manufactured by Ciba Geigy).

The particle sizes of calcium carbonate powders used in the examples of the invention were cumulative 50% particle sizes measured with a laser analysis type particle measuring apparatus "Microtrack" (trade name, manufactured by NIKKISO Co., Ltd.).

The obtained film was evaluated with the following points. The results obtained are shown in Table 2 below.

<Evaluation> i. Evaluation of the Height of Curl

The obtained recording paper of the invention was cut to A-4 size (210 mm×297 mm) and allowed to stand in an air-conditioned room of 23° C. 50% RH for a day. Next, the recording paper was fed and printing was performed through the route that the printed surface of the delivered paper faced upward by a commercially available heat roll fixing type electrophotographic printer (LASER SHOT LBP-950, trade name, manufactured by Canon Inc.).

After passing through the printer, the recording paper was allowed to stand on a flat table at 23° C. 50% RH, and the heights of the curls of four corners two minutes after delivery were measured.

ii. Measurement of Electrostatic Capacity

In the measurement of the electrostatic capacity of the obtained recording paper in the invention, "4192ALF IMPEDANCE ANALYZER" (trade name, manufactured by HEWLETTPACKARD) was used. In an air-conditioned room at 23° C. 50% RH, a sample greater than the diameter of electrode was inserted between electrodes having a diameter of 38 mm, voltage of 5 V was applied, and the electrostatic capacity was evaluated in the frequency of 300 Hz.

iii. Evaluation of Printing Quality

After printing with the above electrophotographic printer, thickening and deformation of the obtained images and letters, deficiency of printing density and staining of background were visually observed and evaluated by the following criteria.

Very good (A): Image and letters are clear (practicable).

Good (B): Thickening and deformation, deficiency of printing density and staining of background are low (practicable).

Failure (C): Thickening and deformation, deficiency of printing density and staining of background are conspicuous (impracticable).

iv. Evaluation of Waterproof Strength

The obtained recording paper was cut to a square of 50 mm×50 mm and immersed in water at 20° C. for a day. The state of the recording paper torn by hand after immersion was evaluated by the following criteria.

Very good (A): The base material does not tear (practicable).

Good (B): The base material does not tear easily (practicable).

Failure (C): The base material tears easily (impracticable).

Example 2

A non-stretched film was prepared by the same procedure as in Example 1 with composition [1]. The non-stretched film was heated at 145° C. (temperature a), and then stretched 5 times in the longitudinal direction to thereby obtain a stretched film (thickness: 150 μm, heat of crystallization 46 J/cm³). Thereafter, the film was subjected to surface oxidation treatment in the same manner as in Example 1, thereby preparing recording paper. The recording paper was evaluated in the same manner as above. The results obtained are shown in Table 2 below.

Example 3

A non-stretched film was prepared by the same procedure as in Example 1 with composition [1]. The non-stretched film was heated at 140° C. (temperature a), and then stretched 5 times in the longitudinal direction to obtain a stretched film.

Composition [1] was extruded in the state of a film from T die connected to an extruder set at 240° C. The obtained film was laminated on both surfaces of the above-prepared 5-time stretched film. The laminate was cooled to 55° C., heated at 160° C. (temperature b), and then stretched 8 times in the transverse direction with a tenter. Thereafter, the laminate was subjected to annealing at 165° C. (temperature c), cooled to 50° C., and the border was slit, thus a film having a three-layer structure (uniaxial stretching/biaxial stretching/uniaxial stretching) was obtained (thickness: 150 μm, heat of crystallization: 46 J/cm$^3$). Subsequently, the film was subjected to surface oxidation treatment in the same manner as in Example 1, thereby preparing recording paper. The recording paper was evaluated in the same manner as above. The results obtained are shown in Table 2.

Example 4

Recording paper was manufactured by the same procedure as in Example 3 except that composition [2] shown in Table 2 was used and the producing conditions of the sample were changed as shown in Table 2. Evaluation was performed in the same manner. The results obtained are shown in Table 2.

Example 5

Non-stretched film was prepared by using composition [3] shown in Table 2. Multistage dies connected with two different extruders set at 250° C. were used. Composition [3] was extruded from the multistage dies in the state of film laminated in three-layer structure. The extruded film was cooled with a cooling unit, thereby obtaining a non-stretched film.

The non-stretched film was heated at 150° C. (temperature a), and then stretched 5 times in the longitudinal direction to obtain a stretched film.

The film was again heated at 165° C. (temperature b), and then stretched 8 times in the transverse direction with a tenter. Thereafter, the film was subjected to annealing at 167° C. (temperature c), cooled to 50° C., and the border was slit, and a film having a three-layer structure (biaxial stretching/biaxial stretching/biaxial stretching) (thickness: 150 μm, heat of crystallization: 32 J/cm$^3$) was obtained. Subsequently, the film was subjected to surface oxidation treatment in the same manner as in Example 1, thereby preparing recording paper. The recording paper was evaluated in the same manner as above. The results obtained are shown in Table 2.

Examples 6 and 7

Each recording paper was manufactured by the same procedure as in Example 2 except that compositions [4] and [5] shown in Table 2 were used and the producing conditions of the samples were changed as shown in Table 2. Evaluation was performed in the same maimer. The results obtained are shown in Table 2.

Example 8

Recording paper was prepared by the same procedure as in Example 3 except for changing the producing conditions of the sample as shown in Table 2. With the recording paper as a support (one side specification), the following-shown coating solution for toner-receiving layer was coated in a solid content of 5 g/m$^2$, then the coated layer was hardened at 90° C. for 1 minute to prepare recording paper having toner-receiving layer (B1) as image-receiving layer (B) and evaluation was performed. The results obtained are shown in Table 2.

<<Toner-Receiving Layer (B1)>>

As the coating solution of toner-receiving layer, 15 parts of 2-hydroxyethyl methacrylate, 50 parts of methyl methacrylate, 35 parts of ethyl acrylate and 100 parts of toluene in a three-necked flask equipped with a stirrer, a reflux condenser and a thermometer, and the inside of the flask was replaced with nitrogen. The mixture was polymerized at 80° C. for 4 hours with 0.6 part of 2,2'-azobisisobutyronitrile as the initiator. The obtained solution was a 50% toluene solution of a hydroxyl group-containing methacrylate polymer having a hydroxyl value of 65.

Next, a 75% ethyl acetate solution of hexamethylenediisocyanate (Coronate HL, manufactured by Nippon Polyurethane Industries Co., Ltd.), silica particles having an average secondary particle size of 3 μm (Sylysia 370, manufactured by Fuji Silysia), and heavy calcium carbonate having an average particle size of 1.5 μm (manufactured by SHIRAISHI CALCIUM KAISHA, LTD.) were blended with the above prepared solution in the solids content ratio as shown below.

<<Ratio of Solid Contents>>

| | |
|---|---|
| Methacrylate polymer | 48 wt % |
| Hexamethylenediisocyanate | 2 wt % |
| Silica | 25 wt % |
| Heavy calcium carbonate | 25 wt % |

Butyl acetate was added to the above mixture to adjust the solids content to 35 wt %.

Comparative Example 1

Recording paper was manufactured by the same procedure as in Example 1 except that composition [6] shown in Table 2 was used. Evaluation was performed in the same manner. The results obtained are shown in Table 2.

Comparative Example 2

Recording paper was manufactured by the same procedure as in Example 3 except that composition [7] shown in Table 2 was used. Evaluation was performed in the same manner. The results obtained are shown in Table 2.

Comparative Example 3

Recording paper having a thickness of 350 μm was manufactured by the same procedure as in Example 3 except that composition [6] shown in Table 2 was used and the producing conditions of the sample were changed as shown in Table 2. Evaluation was performed in the same manner. The results obtained are shown in Table 2.

Comparative Example 4

Evaluation was performed with commercially available pulp paper "My Recycle Paper 100w" (trade name, manufactured by NBS RICOH Co., Ltd.). The results obtained are shown in Table 2.

TABLE 2

|  |  | Unit | Example 1 | Example 2 | Example 3 | Example 4 |
|---|---|---|---|---|---|---|
| Blending Components | Composition | — | Comp. [1] | Comp. [1] | Comp. [1] | Comp. [2] |
|  | Thermoplastic resin kind 1 | — | PP | PP | PP | PP |
|  | Blending amount | wt % | 29 | 29 | 29 | 10 |
|  | Kind 2 | — | TPO | TPO | TPO | TPO |
|  | Blending amount | wt % | 41 | 41 | 41 | 40 |
|  | Inorganic fine powder/organic filler kind | — | Calcium carbonate A | Calcium carbonate A | Calcium carbonate A | Calcium carbonate B |
|  | Average particle size or average dispersion particle size | μm | Φ1.8 | 1.8 | 1.8 | 1.8 |
|  | Blending amount | wt % | 30 | 30 | 30 | 50 |
| Producing Conditions | Temperature a | ° C. | — | 145 | 140 | 140 |
|  | Temperature b | ° C. | — | — | 160 | 163 |
|  | Temperature c | ° C. | — | — | 165 | 165 |
|  | Stretching | — | Non-stretching | Uniaxial stretching | Biaxial stretching | Biaxial stretching |
|  | Magnification of stretching | time | 1 × 1 | 1 × 5 | 5 × 8 | 5 × 8 |
| Results of Evaluation | Thickness of recording paper | μm | 150 | 150 | 150 | 150 |
|  | Heat of crystallization of recording paper | J/cm$^3$ | 51 | 51 | 51 | 37 |
|  | Porosity | % | 0 | 15 | 25 | 42 |
|  | Surface oxidation treatment | — | Yes | Yes | Yes | Yes |
|  | Toner-receiving layer (B1) | — | No | No | No | No |
|  | Height of curl of recording paper (2 min. after printing) | mm | 24 | 24 | 24 | 0 |
|  | Electrostatic capacity of recording paper | pF/cm$^2$ | 13 | 13 | 13 | 28 |
|  | Printing quality | Visual observation | A | A | A | A |
|  | Waterproof strength | Visual observation | A | A | A | A |

|  |  | Unit | Example 5 | Example 6 | Example 7 | Example 8 |
|---|---|---|---|---|---|---|
| Blending Components | Composition | — | Comp. [3] | Comp. [4] | Comp. [5] | Comp. [1] |
|  | Thermoplastic resin kind 1 | — | PP | HDPE | PP | PP |
|  | Blending amount | wt % | 20 | 10 | 20 | 29 |
|  | Kind 2 | — | TPO | TPO | TPO | TPO |
|  | Blending amount | wt % | 35 | 40 | 75 | 41 |
|  | Inorganic fine powder/organic filler kind | — | Calcium carbonate A | Calcium carbonate A | PBT | Calcium carbonate A |
|  | Average particle size or average dispersion particle size | μm | 1.8 | 1.8 | 2.0 | 1.8 |
|  | Blending amount | wt % | 45 | 50 | 5 | 30 |
| Producing Conditions | Temperature a | ° C. | 150 | 110 | 145 | 140 |
|  | Temperature b | ° C. | 165 | — | — | 160 |
|  | Temperature c | ° C. | 167 | — | — | 165 |
|  | Stretching | — | Biaxial stretching | Uniaxial stretching | Uniaxial stretching | Biaxial stretching |
|  | Magnification of stretching | time | 5 × 8 | 1 × 5 | 1 × 5 | 5 × 8 |
| Results of Evaluation | Thickness of recording paper | μm | 150 | 150 | 150 | 150 |
|  | Heat of crystallization of recording paper | J/cm$^3$ | 44 | 51 | 50 | 51 |
|  | Porosity | % | 40 | 10 | 5 | 25 |
|  | Surface oxidation treatment | — | Yes | Yes | Yes | Yes |
|  | Toner-receiving layer (B1) | — | No | No | No | Yes |
|  | Height of curl of recording paper (2 min. after printing) | mm | 0 | 22 | 17 | 8 |
|  | Electrostatic capacity of recording paper | pF/cm$^2$ | 6 | 24 | 22 | 12 |
|  | Printing quality | Visual observation | B | A | A | A |
|  | Waterproof strength | Visual observation | A | A | A | A |

|  |  | Unit | Comparative Example 1 | Comparative Example 2 | Comparative Example 3 | Comparative Example 4 |
|---|---|---|---|---|---|---|
| Blending Components | Composition | — | Comp. [6] | Comp. [7] | Comp. [8] | — |
|  | Thermoplastic resin kind 1 | — | PP | PP | PP | Pulp paper |
|  | Blending amount | wt % | 100 | 55 | 100 |  |
|  | Kind 2 | — | — | TPO | — |  |
|  | Blending amount | wt % | 0 | 15 | 0 |  |

TABLE 2-continued

| | | | | | | |
|---|---|---|---|---|---|---|
| | Inorganic fine powder/organic filler kind | | — | — | Calcium carbonate A | |
| | Average particle size or average dispersion particle size | μm | — | 1.8 | — | |
| Producing Conditions | Blending amount | wt % | 0 | 30 | 0 | |
| | Temperature a | ° C. | — | 140 | 140 | |
| | Temperature b | ° C. | — | 160 | 160 | |
| | Temperature c | ° C. | — | 165 | 165 | |
| | Stretching | — | Non-stretching | Biaxial stretching | Biaxial stretching | |
| | Magnification of stretching | time | 1 × 1 | 5 × 8 | 5 × 8 | |
| Results of Evaluation | Thickness of recording paper | μm | 150 | 150 | 350 | 100 |
| | Heat of crystallization of recording paper | J/cm³ | 85 | 66 | 85 | — |
| | Porosity | % | 0 | 28 | 0 | — |
| | Surface oxidation treatment | — | Yes | Yes | Yes | — |
| | Toner-receiving layer (B1) | — | No | No | No | — |
| | Height of curl of recording paper (2 min. after printing) | mm | Cylindrical | 65 | Cylindrical | 0 |
| | Electrostatic capacity of recording paper | pF/cm² | 9 | 10 | 4 | 200 |
| | Printing quality | Visual observation | A | A | C | A |
| | Waterproof strength | Visual observation | A | A | A | C |

Example 9

Resin Film (A)

Composition [8] obtained by blending 20 wt % of calcium carbonate C (shown in Table 1) with a mixture comprising 30 wet % of PP (shown in Table 1) and 50 wt % of HSBR (shown in Table 1) was kneaded with an extruder set at 250° C., extruded in the state of strands, and cut to prepare pellets. Composition [8] was extruded in the state of a film from T die connected to the extruder set at 250° C., and cooled by a cooling unit, thereby non-stretched film was obtained (thickness: 100 μm, heat of crystallization: 29 J/cm³).

Both surfaces of the film were subjected to corona discharge treatment at applied energy density of 100 W·min/m².

<Formation of Heat-Sensitive Recording Layer (B2)>

As image-receiving layer (B), direct heat-sensitive recording layer-forming composition comprising the components shown below was coated on resin film (A) obtained in Example 9 to prepare heat-sensitive recording layer (B2) having a dry thickness of 10 μm.

[Direct Heat-Sensitive Recording Layer-Forming Composition]

[Preparation of Solution A]

| | |
|---|---|
| 3-(N-Methyl-N-cyclohexylamino)-6-methyl-7-anilinofluoran | 4 weight parts |
| 3-Diethylamino-7-orthochloro-anilinofluoran | 1 weight part |
| A 5% aq. soln. of hydroxyethyl cellulose | 20 weight parts |

The composition comprising this proportion was pulverized with a sand grinder until an average particle size of 2 μm.

[Preparation of Solution B]

| | |
|---|---|
| 4,4'-Isopropylidenediphenol (bisphenol A) | 25 weight parts |
| Stearic acid amide | 15 weight parts |
| A 5% aq. soln. of hydroxyethyl cellulose | 140 weight parts |

The composition comprising this proportion was pulverized with a sand grinder until an average particle size of 2 μm.

Twenty-five (25) weight parts of Solution A, 180 weight parts of Solution B, 70 weight parts of a 50% aqueous dispersion of talc, and 240 weight parts of a 5% aqueous solution of hydroxyethyl cellulose were mixed.

The obtained film was evaluated with the following points. The results obtained are shown in Table 3 below.

<Evaluation> i. Evaluation of the Height of Curl

The obtained recording paper of the invention was cut to A-4 size (210 mm×297 mm) and allowed to stand in an air-conditioned room of 23° C. 50% RH for a day, and printing of black solid was performed through the paper-feeding route with image-receiving layer (B) as printing surface by a commercially available direct heat-sensitive printer "MULTISCAN VIDEO PRINTER UP-930" (trade name, manufactured by Sony Corporation).

After passing through the printer, the heat-sensitive recording paper was allowed to stand on a flat table at 23° C. 50% RH, and the heights of the curls of four corners two minutes after delivery were measured.

ii. Evaluation of Printing Quality

After printing with the above direct heat-sensitive printer, printing density of the black solid part was visually observed and evaluated by the following criteria.

Very good (A): There is no density unevenness (practicable).
Good (B): Density unevenness is seen a little (practicable).
Failure (C): There is density unevenness (impracticable).

iii. Evaluation of Waterproof Strength

The obtained recording paper was cut to a square of 50 mm×50 mm and immersed in water at 20° C. for a day. The state of the recording paper torn by hand after immersion was evaluated by the following criteria.

Very good (A): The base material does not tear (practicable).
Good (B): The base material does not tear easily (practicable).
Failure (C): The base material tears easily (impracticable).

Example 10

Recording paper was manufactured by the same procedure as in Example 9 except that composition [9] shown in Table 3 was used. Evaluation was performed in the same manner. The results obtained are shown in Table 3.

Example 11

A non-stretched film was prepared by the same procedure as in Example 9 with composition [10] shown in Table 3. The non-stretched film was heated at 145° C. (temperature a), and then stretched 5 times in the longitudinal direction to thereby obtain a stretched film (thickness: 100 μm, heat of crystallization 37 J/cm³). Thereafter, recording paper was manufactured by the same procedure as in Example 9. The recording paper was evaluated in the same manner as above. The results obtained are shown in Table 3 below.

Example 12

A non-stretched film was prepared by the same procedure as in Example 9 with composition [11] as shown in Table 3. The non-stretched film was heated at 140° C. (temperature a), and then stretched 5 times in the longitudinal direction to obtain a stretched film.

Composition [11] was extruded in the state of a film from T die connected to an extruder set at 240° C. The obtained film was laminated on both surfaces of the above-prepared 5-time stretched film. The laminate was cooled to 55° C., heated at 160° C. (temperature b), and then stretched 8 times in the transverse direction with a tenter. Thereafter, the laminate was subjected to annealing at 165° C. (temperature c), cooled to 50° C., and the border was slit, thus a film having a three-layer structure (uniaxial stretching/biaxial stretching/uniaxial stretching) was obtained (thickness: 100 μm, heat of crystallization: 41 J/cm³). Subsequently, recording paper was manufactured by the same procedure as in Example 9, and evaluated. The results obtained are shown in Table 3 below.

Example 13

Non-stretched film was prepared by using composition [12] shown in Table 3. Multistage dies connected with two different extruders set at 250° C. were used. Composition [12] was extruded from the multistage dies in the state of film laminated in three-layer structure. The extruded film was cooled with a cooling unit, thereby obtaining a non-stretched film.

The non-stretched film was heated at 140° C. (temperature a), and then stretched 5 times in the longitudinal direction to obtain a stretched film.

The film was again heated at 163° C. (temperature b), and then stretched 8 times in the transverse direction with a tenter. Thereafter, the film was subjected to annealing at 168° C. (temperature c), cooled to 50° C., and the border was slit, and a film having a three-layer structure (biaxial stretching/biaxial stretching/biaxial stretching) was obtained (thickness: 100 μm, heat of crystallization: 41 J/cm³). Subsequently, recording paper was manufactured by the same procedure as in Example 9, and evaluated. The results obtained are shown in Table 3 below.

Comparative Example 5

Recording paper was manufactured by the same procedure as in Example 9 except that composition [6] shown in Table 3 was used. Evaluation was performed in the same manner. The results obtained are shown in Table 3.

Comparative Example 6

Recording paper was manufactured by the same procedure as in Example 13 except that composition [13] shown in Table 3 was used. Evaluation was performed in the same manner. The results obtained are shown in Table 3.

TABLE 3

| | | | Example No. | | |
|---|---|---|---|---|---|
| | | Unit | Example 9 | Example 10 | Example 11 |
| Blending Components | Composition | — | Comp. [8] | Comp. [9] | Comp. [10] |
| | Thermoplastic resin kind 1 | — | PP | PP | PP |
| | Blending amount | wt % | 30 | 0 | 0 |
| | Kind 2 | — | HSBR | TPO | TPO |
| | Blending amount | wt % | 50 | 80 | 80 |
| | Inorganic fine powder/organic filler kind | — | Calcium carbonate C | PBT | Calcium carbonate C |
| | Average particle size or average dispersion particle size | μm | 1.5 | 2.0 | 1.5 |
| | Blending amount | wt % | 20 | 20 | 20 |
| Producing Conditions | Temperature a | ° C. | — | — | 145 |
| | Temperature b | ° C. | — | — | — |
| | Temperature c | ° C. | — | — | — |
| | Stretching | — | Non-stretching | Non-stretching | Uniaxial stretching |
| | Magnification of stretching | time | 1 × 1 | 1 × 1 | 1 × 5 |
| Results of Evaluation | Thickness of recording paper | μm | 100 | 100 | 100 |
| | Heat of crystallization of recording paper | J/cm³ | 29 | 43 | 37 |
| | Porosity | % | 0 | 0 | 8 |
| | Surface oxidation treatment | — | Yes | Yes | Yes |
| | Heat-sensitive recording layer (B2) | — | Yes | Yes | Yes |
| | Height of curl of recording paper (2 min. after printing) | mm | 0 | 8 | 0 |
| | Printing quality | Visual observation | B | B | A |
| | Waterproof strength | Visual observation | A | A | A |

TABLE 3-continued

|  |  | Unit | Example No. | |
|---|---|---|---|---|
|  |  |  | Example 12 | Example 13 |
| Blending Components | Composition |  | Comp. [11] | Comp. [12] |
|  | Thermoplastic resin kind 1 | — | PP | PP |
|  | Blending amount | wt % | 10 | 30 |
|  | Kind 2 | — | TPO | TPO |
|  | Blending amount | wt % | 60 | 30 |
|  | Inorganic fine powder/organic filler kind | — | Calcium carbonate C | Calcium carbonate C |
|  | Average particle size or average dispersion particle size | μm | 1.5 | 1.5 |
|  | Blending amount | wt % | 30 | 40 |
| Producing Conditions | Temperature a | ° C. | 140 | 140 |
|  | Temperature b | ° C. | 160 | 163 |
|  | Temperature c | ° C. | 165 | 168 |
|  | Stretching | — | Biaxial stretching | Biaxial stretching |
|  | Magnification of stretching | time | 5 × 8 | 5 × 8 |
| Results of Evaluation | Thickness of recording paper | μm | 100 | 100 |
|  | Heat of crystallization of recording paper | J/cm³ | 41 | 51 |
|  | Porosity | % | 23 | 35 |
|  | Surface oxidation treatment | — | Yes | Yes |
|  | Heat-sensitive recording layer (B2) | — | Yes | Yes |
|  | Height of curl of recording paper (2 min. after printing) | mm | 6 | 34 |
|  | Printing quality | Visual observation | B | A |
|  | Waterproof strength | Visual observation | A | A |

|  |  | Unit | Comparative Example No. | | |
|---|---|---|---|---|---|
|  |  |  | Comparative Example 5 | Comparative Example 6 | Comparative Example 7 |
| Blending Components | Composition |  | Comp. [6] | Comp. [13] | Pulp paper |
|  | Thermoplastic resin kind 1 | — | PP | PP |  |
|  | Blending amount | wt % | 100 | 55 |  |
|  | Kind 2 | — | — | TPO |  |
|  | Blending amount | wt % | 0 | 15 |  |
|  | Inorganic fine powder/organic filler kind | — | — | Calcium carbonate C |  |
|  | Average particle size or average dispersion particle size | μm | — | 1.5 |  |
|  | Blending amount | wt % | 0 | 30 |  |
| Producing Conditions | Temperature a | ° C. | — | 140 | — |
|  | Temperature b | ° C. | — | 160 | — |
|  | Temperature c | ° C. | — | 165 | — |
|  | Stretching | — | Non-stretching | Biaxial stretching | — |
|  | Magnification of stretching | time | 1 × 1 | 5 × 8 | — |
| Results of Evaluation | Thickness of recording paper | μm | 100 | 100 | 100 |
|  | Heat of crystallization of recording paper | J/cm³ | 85 | 66 | — |
|  | Porosity | % | 0 | 28 | — |
|  | Surface oxidation treatment | — | Yes | Yes | — |
|  | Heat-sensitive recording layer (B2) | — | Yes | Yes | Yes |
|  | Height of curl of recording paper (2 min. after printing) | mm | Cylindrical | 66 | 0 |
|  | Printing quality | Visual observation | B | A | A |
|  | Waterproof strength | Visual observation | A | A | C |

Example 14

Non-stretched film was prepared by using composition [14] shown in Table 4 below, composition [14] as layer (C) capable of layer-from-layer peeling, and composition [1] as resin film (A). Multistage dies connected with two different extruders set at 250° C. were used. These compositions were extruded from the multistage dies in the state of film laminated in two-layer structure. The extruded film was cooled with a cooling unit, thereby obtaining a non-stretched film.

The non-stretched film was heated at 150° C. (temperature a), and then stretched 5 times in the longitudinal direction to obtain a stretched film.

The film was again heated at 140° C. (temperature b), and then stretched 8 times in the transverse direction with a tenter. Thereafter, the film was subjected to annealing at 160° C. (temperature c), cooled to 50° C., and the border was slit, and a film having a two-layer structure ((C)/(A): thickness: 30/115 μm) was obtained (thickness: 145 μm). Subsequently, the film was subjected to surface oxidation treatment in the same manner as in Example 1, thereby preparing recording paper.

The obtained recording paper was evaluated with the following points. The results obtained are shown in Table 4 below.

<Evaluation>
<<Adhesive Layer (E)>>

Adhesive "Oribain BPS-1109" (trade name, manufactured by Toyo Ink Mfg. Co., Ltd.) was coated on the surface of layer (C) capable of layer-from-layer peeling of the obtained recording paper by a comma coater in solid content of 25 g/m² and dried to provide adhesive layer (E).

v. Initiating Property of Peeling

The peeling strength of layer (C) capable of layer-from-layer peeling and the breaking strength of surface layer (D) were respectively measured by the methods described above in the <Peeling Strength> and <Breaking strength>.

The obtained recording paper coated with an adhesive was cut to a square of 5 cm×5 cm and adhered on an official postcard. One side of four sides of the recording paper was held by hand and peeled from the postcard, and the state until layer (C) capable of layer-from-layer peeling or surface layer (D) initiated peeling was evaluated by the following criteria.

Very good (A): Peeling initiates immediately (practicable).
Good (B): It requires 2 mm or more to initiate peeling (practicable).
A little failure (C): Peeling initiates partially (impracticable).
Failure (D): It requires 10 mm or more to initiate peeling (impracticable).

vi. Running Property of Peeling

The obtained recording paper coated with an adhesive was cut to a square of 5 cm×5 cm and adhered on an official postcard. An adhesive tape (Cello-Tape, trade name, manufactured by Nichiban Co., Ltd.) was stuck on one side of four sides of resin film (A) face to assist peeling of layer (C) capable of layer-from-layer peeling or surface layer (D). Resin film (A) was peeled from the postcard, and running property and peeling strength of layer (C) capable of layer-from-layer peeling or surface layer (D) were visually observed and evaluated by the following criteria.

Very good (A): Peeling strength is light and runs throughout the surface completely (practicable).
Good (B): Peeling strength is a little heavy but runs all over the surface completely (practicable).
A little failure (C): Peeling strength is very heavy but runs all over the surface completely (impracticable).
Failure (D): Running all over the surface is impossible and breaking occurs on the way (impracticable).

vii. Data-Masking Property

Twenty-six letters of alphabet of 10-point letter size were printed on an official postcard, and the recording paper coated with an adhesive was adhered on the printed face of alphabet. The masking property of the letters seen through manufactured film was visually observed and evaluated by the following criteria.

Very good (A): Practicable
Good (B): Practicable
A little failure (C): Impracticable
Failure (D): Impracticable viii. Data-Recognizing Property A reading out sample was prepared by printing bar code (CODE39) on synthetic paper "VES85" (trade name, manufactured by YUPO CORPORATION) with a bar code printer "B30" (trade name, manufactured by TEC CO., LTD.).

The recording paper coated with an adhesive was stuck on the printed face of bar code on the synthetic paper, and ten samples masking the bar code were prepared. The bar code after peeling resin film (A) was read with a bar code reader "LASERCHEK II" (trade name, manufactured by Fuji Electrical Refrigerating Machine Co., Ltd.), and the number of times that succeeded in the recognition of bar code was evaluated by the following criteria.

Very good (A): Success of 10 times (practicable).
Good (B): Success of 8 or 9 times (practicable).
A little failure (C): Success of 2 to 7 times (impracticable).
Failure (D): Success of 1 time or less (impracticable).

Example 15

LDPE (shown in Table 1) was extruded in the state of a film from T die connected to an extruder set at 180° C. The obtained film was laminated on the surface of layer (C) capable of layer-from-layer peeling of 5-time stretched film prepared by the same procedure as in Example 14, and surface layer (D) was provided. The laminate was cooled to 55° C., heated at 143° C. (temperature b), and then stretched 8 times in the transverse direction with a tenter. Thereafter, the laminate was subjected to annealing at 160° C. (temperature c), cooled to 50° C., and the border was slit, thus a film having a three-layer structure ((D)/(C)/(A): thickness: 5/30/115 μm) was obtained (thickness: 150 μm). Subsequently, the film was subjected to surface oxidation treatment in the same manner as in Example 1, thereby preparing recording paper. The recording paper was evaluated in the same manner as in Example 14. The results obtained are shown in Table 4.

Comparative Example 8

Recording paper was manufactured by the same procedure as in Example 15 except for using composition [6] (shown in Table 2) as resin film (A), composition [15] (shown in Table 4) as layer (C) capable of layer-from-layer peeling, and EVA (shown in Table 1) as surface layer (D), and the producing conditions as shown in Table 4. Evaluation was performed in the same manner as in Example 15. The results obtained are shown in Table 4.

TABLE 4

| | | Unit | Example 14 | Example 15 | Comparative Example 8 |
|---|---|---|---|---|---|
| Blending Components | Composition of resin film (A) | | Composition [1] | Composition [1] | Composition [6] |
| | Composition of peeling layer (C) | | Composition [14] | Composition [14] | Composition [15] |
| | Thermoplastic resin kind 1 | — | PP | PP | PP |
| | Blending amount | wt % | 45 | 45 | 92 |
| | Inorganic fine powder/organic filler kind | — | Calcium carbonate A | Calcium carbonate A | Calcium carbonate A |
| | Blending amount | wt % | 55 | 55 | 8 |
| | Composition of surface layer (D) | | — | LDPE | EVA |
| Producing Conditions | Temperature a | ° C. | 150 | 150 | 150 |
| | Temperature b | ° C. | 143 | 143 | 143 |
| | Temperature c | ° C. | 160 | 160 | 160 |
| | Stretching | — | Biaxial stretching | Biaxial stretching | Biaxial stretching |
| | Magnification of stretching | time | 5 × 8 | 5 × 8 | 5 × 8 |
| Results of Evaluation | Thickness of film (total) | μm | 145 | 150 | 150 |
| | [(D)/(C)/(A)] | μm | —/30/115 | 5/30/115 | 25/10/115 |
| | Heat of crystallization of film | J/cm$^3$ | 53 | 54 | 83 |
| | Porosity of resin film (A) | % | 25 | 25 | 0 |
| | Height of curl of recording paper (2 min. after printing) | mm | 38 | 40 | Cylindrical |
| | Electrostatic capacity of recording paper | pF/cm$^2$ | 13 | 13 | 13 |
| | Peeling strength (layer (C)) | g/cm | 23 | 23 | 490 |
| | Breaking strength (layer (D)) | g/cm | — | 200 | 700 |
| | Initiating property of peeling | Visual observation | B | A | D |
| | Running property of peeling | Visual observation | A | A | D |
| | Data masking property | Visual observation | A | A | B |
| | Data recognizing property | Reading out of bar code | A | A | A |

Example 16

Non-stretched film was prepared by using composition [16] shown in Table 5 below, composition [16] as layer (C) capable of layer-from-layer peeling, and composition [10] as resin film (A). Multistage dies connected with two different extruders set at 250° C. were used. These compositions were extruded from the multistage dies in the state of film laminated in two-layer structure. The extruded film was cooled with a cooling unit, thereby obtaining a non-stretched film.

The non-stretched film was heated at 150° C. (temperature a), and then stretched 5 times in the longitudinal direction to obtain a stretched film.

The film was again heated at 143° C. (temperature b), and then stretched 8 times in the transverse direction with a tenter. Thereafter, the film was subjected to annealing at 160° C. (temperature c), cooled to 50° C., and the border was slit, and a film having a two-layer structure ((C)/(A): thickness: 15/80 μm) was obtained (thickness: 95 μm). Subsequently, recording paper provided with heat-sensitive layer (B2) was prepared by the same procedure as in Example 9.

<<Adhesive Layer (E)>>

Pressure-sensitive adhesive "Oribain BPS-1109" (trade name, manufactured by Toyo Ink Mfg. Co., Ltd.) was coated on the surface of layer (C) capable of layer-from-layer peeling of the obtained recording paper by a comma coater in solid content of 25 g/m$^2$ and dried.

The obtained recording paper was evaluated in the same manner as in Example 14. The results obtained are shown in Table 5 below.

Example 17

LDPE (shown in Table 1) was extruded in the state of a film from T die connected to an extruder set at 180° C. The obtained film was laminated on the surface of layer (C) capable of layer-from-layer peeling of 5-time stretched film prepared by the same procedure as in Example 16, and surface layer (D) was provided. The laminate was cooled to 55° C., heated at 148° C. (temperature b), and then stretched 8 times in the transverse direction with a tenter. Thereafter, the laminate was subjected to annealing at 160° C. (temperature c), cooled to 50° C., and the border was slit, thus a film having a three-layer structure ((D)/(C)/(A): thickness: 5/15/80 μm) was obtained (thickness: 100 μm). Subsequently, recording paper was manufactured by the same procedure as in Example 16, and the recording paper was evaluated. The results obtained are shown in Table 5.

Comparative Example 9

Heat-sensitive recording paper was manufactured by the same procedure as in Example 17 except for using composition [6] (shown in Table 3) as resin film (A), composition [17] (shown in Table 5) as layer (C) capable of layer-from-layer peeling, and EVA (shown in Table 1) as surface layer (D), and the producing conditions as shown in Table 5, and evaluation was performed. The results obtained are shown in Table 5.

TABLE 5

| | | Unit | Example 16 | Example 17 | Comparative Example 9 |
|---|---|---|---|---|---|
| Blending Components | Composition of resin film (A) | | Composition [10] | Composition [10] | Composition [6] |
| | Composition of peeling layer (C) | | Composition [16] | Composition [16] | Composition [17] |
| | Thermoplastic resin kind 1 | — | PP | PP | PP |
| | Blending amount | wt % | 50 | 50 | 95 |
| | Inorganic fine powder/organic filler kind | — | Calcium carbonate C | Calcium carbonate C | Calcium carbonate C |
| | Blending amount | wt % | 50 | 50 | 5 |
| | Composition of surface layer (D) | — | — | LDPE | EVA |
| Producing Conditions | Temperature a | ° C. | 150 | 150 | 150 |
| | Temperature b | ° C. | 143 | 143 | 143 |
| | Temperature c | ° C. | 160 | 160 | 160 |
| | Stretching | — | Biaxial stretching | Biaxial stretching | Biaxial stretching |
| | Magnification of stretching | time | 5 × 8 | 5 × 8 | 5 × 8 |
| Results of Evaluation | Thickness of film (total) | μm | 95 | 100 | 100 |
| | [(D)/(C)/(A)] | μm | —/15/80 | 5/15/80 | 25/5/70 |
| | Heat of crystallization of film | J/cm$^3$ | 42 | 44 | 81 |
| | Porosity of resin film (A) | % | 23 | 23 | 0 |
| | Height of curl of recording paper (2 min. after printing) | mm | 15 | 19 | Cylindrical |
| | Peeling strength (layer (E)) | g/cm | 25 | 25 | 500 |
| | Breaking strength (layer (F)) | g/cm | — | 200 | 700 |
| | Initiating property of peeling | Visual observation | B | A | D |
| | Running property of peeling | Visual observation | A | A | D |
| | Data masking property | Visual observation | A | A | B |
| | Data recognizing property | Reading out of bar code | A | A | A |

Example 18

<Resin Film (A)>

Composition [18] obtained by blending 10 wt % of calcium carbonate A (shown in Table 1) with a mixture comprising 6 wt % of PP (shown in Table 1) and 84 wt % of HSBR (shown in Table 1) was kneaded with an extruder set at 250° C., extruded in the state of strands, and cut to prepare pellets. Composition [18] was extruded in the state of a film from T die connected to the extruder set at 250° C., and cooled by a cooling unit, thereby non-stretched film was obtained (thickness: 55 μm, heat of crystallization: 6 J/cm$^3$).

Both surfaces of the film were subjected to corona discharge treatment at applied energy density of 90 W·min/m$^2$.

<Formation of Adhesive Layer (E) and Sticking of Strippable Paper (F)>

Wood free paper both surfaces of which were laminated with a polyethylene film and one surface of which was treated with silicon having a thickness of 100 μm and density of 0.9 g/cm$^3$ was used as strippable paper (F). Pressure-sensitive adhesive "Oribain BPS-1109" (trade name, manufactured by Toyo Ink Mfg. Co., Ltd.) was coated on the silicon-treated surface of strippable paper (F) in a solid content of 25 g/m$^2$ with a comma coater and dried to prepare adhesive layer (E). The thus-obtained adhesive layer (E) on strippable paper (F) was stuck on resin film (A), thereby obtaining label paper of the invention.

The obtained label paper was evaluated in the same manner as in Example 1. The results obtained are shown in Table 6 below.

Example 19

A non-stretched film was prepared by the same procedure as in Example 18 with composition [19] shown in Table 6. The non-stretched film was heated at 145° C. (temperature a), and then stretched 5 times in the longitudinal direction to thereby obtain a stretched film (thickness: 60 μm, heat of crystallization 31 J/cm$^3$). Thereafter, label paper was manufactured by the same procedure as in Example 18, and evaluated. The results obtained are shown in Table 6 below.

Example 20

A non-stretched film was prepared by the same procedure as in Example 18 with composition [20] as shown in Table 6. The non-stretched film was heated at 140° C. (temperature a), and then stretched 5 times in the longitudinal direction to obtain a stretched film.

Composition [20] was extruded in the state of a film from T die connected to an extruder set at 240° C. The obtained film was laminated on both surfaces of the above-prepared 5-time stretched film. The laminate was cooled to 55° C., heated at 160° C. (temperature b), and then stretched 8 times in the transverse direction with a tenter. Thereafter, the laminate was subjected to annealing at 165° C. (temperature c), cooled to 50° C., and the border was slit, thus a film having a three-layer structure (uniaxial stretching/biaxial stretching/uniaxial stretching) was obtained (thickness: 60 μm, heat of crystallization: 46 J/cm$^3$). Subsequently, label paper was manufactured by the same procedure as in Example 18, and evaluated. The results obtained are shown in Table 6 below.

Examples 21 to 23

Each label paper was manufactured by the same procedure as in Example 18 except that each of compositions [21] to [23] shown in Table 6 was used. Evaluation was performed in the same manner. The results obtained are shown in Table 6.

Example 24

Non-stretched film was prepared by using composition [24] shown in Table 6. Multistage dies connected with two different extruders set at 250° C. were used. Composition [24] was extruded from the multistage dies in the state of film laminated in three-layer structure. The extruded film was cooled with a cooling unit, thereby obtaining a non-stretched film.

The non-stretched film was heated at 140° C. (temperature a), and then stretched 5 times in the longitudinal direction and cooled to obtain a stretched film.

The film was again heated at 160° C. (temperature b), and then stretched 8 times in the transverse direction with a tenter. Thereafter, the film was subjected to annealing at 165° C. (temperature c), cooled to 50° C., and the border was slit, and a film having a three-layer structure (biaxial stretching/biaxial stretching/biaxial stretching) was obtained (thickness: 65 μm, heat of crystallization: 44 J/cm$^3$). Subsequently, label paper was manufactured by the same procedure as in Example 18, and evaluated. The results obtained are shown in Table 6 below.

Example 25

Label paper was prepared by the same procedure as in Example 20 except for changing the producing conditions of the sample as shown in Table 6. With the corona discharge treated film as a support (one side specification), a toner-receiving layer (B1) was provided by the same procedure as in Example 8, then strippable paper (F) prepared by the same procedure as in Example 18 was stuck on the side of the support opposite to the side having toner-receiving layer (B1), and evaluation was performed. The results obtained are shown in Table 6.

Comparative Example 10

Label paper was manufactured by the same procedure as in Example 18 except that composition [6] shown in Table 6 was used. Evaluation was performed in the same manner. The results obtained are shown in Table 6.

Comparative Example 11

Label paper was manufactured by the same procedure as in Example 20 except that composition [25] shown in Table 6 was used. Evaluation was performed in the same manner. The results obtained are shown in Table 6.

Comparative Example 12

Label paper was manufactured by the same procedure as in Comparative Example 11 except for using strippable paper of wood free paper having a thickness of 250 μm and density of 0.9 g/cm$^3$ and both surfaces of which were laminated with a polyethylene film and one surface of which was treated with silicon. The results of evaluation are shown in Table 6.

TABLE 6

| | | | Example No. | | |
| --- | --- | --- | --- | --- | --- |
| | | Unit | Example 18 | Example 19 | Example 20 |
| Blending Components | Composition | — | Comp. [18] | Comp. [19] | Comp. [20] |
| | Thermoplastic resin kind 1 | — | PP | PP | PP |
| | Blending amount | wt % | 6 | 0 | 23 |
| | Kind 2 | — | HSBR | TPO | TPO |
| | Blending amount | wt % | 84 | 55 | 32 |
| | Inorganic fine powder/organic filler kind | — | Calcium carbonate A | Calcium carbonate A | Calcium carbonate A |
| | Average particle size or average dispersion particle size | μm | 1.8 | 1.8 | 1.8 |
| | Blending amount | wt % | 10 | 45 | 45 |
| Producing Conditions | Temperature a | ° C. | — | 145 | 140 |
| | Temperature b | ° C. | — | — | 160 |
| | Temperature c | ° C. | — | — | 165 |
| | Stretching | — | Non-stretching | Uniaxial stretching | Biaxial stretching |
| | Magnification of stretching | time | 1 × 1 | 1 × 5 | 5 × 8 |
| Results of Evaluation | Thickness of base material layer (A) | μm | 55 | 60 | 60 |
| | Heat of crystallization of base material layer (A) | J/cm$^3$ | 5 | 32 | 46 |
| | Porosity | % | 0 | 23 | 35 |
| | Surface oxidation treatment | — | Yes | Yes | Yes |
| | Thickness of strippable paper (C) | μm | 100 | 100 | 100 |
| | Toner-receiving layer (B1) | — | No | No | No |
| | Height of curl of label paper (2 min. after printing) | mm | 0 | 0 | 21 |
| | Electrostatic capacity of label paper | pF/cm$^2$ | 8 | 7 | 6 |
| | Printing quality | Visual observation | A | B | B |
| | Waterproof strength | Visual observation | A | A | A |

| | | | Example No. | | |
| --- | --- | --- | --- | --- | --- |
| | | Unit | Example 21 | Example 22 | Example 23 |
| Blending Components | Composition | — | Comp. [21] | Comp. [22] | Comp. [23] |
| | Thermoplastic resin kind 1 | — | PP | HDPE | PP |
| | Blending amount | wt % | 10 | 10 | 20 |
| | Kind 2 | — | TPO | TPO | TPO |
| | Blending amount | wt % | 40 | 40 | 75 |

TABLE 6-continued

|  |  | Unit |  |  |  |
|---|---|---|---|---|---|
|  | Inorganic fine powder/organic filler kind | — | Calcium carbonate A | Calcium carbonate A | PBT |
|  | Average particle size or average dispersion particle size | μm | 1.8 | 1.8 | 2.0 |
|  | Blending amount | wt % | 50 | 50 | 5 |
| Producing Conditions | Temperature a | ° C. | — | — | — |
|  | Temperature b | ° C. | — | — | — |
|  | Temperature c | ° C. | — | — | — |
|  | Stretching | — | Non-stretching | Non-stretching | Non-stretching |
|  | Magnification of stretching | time | 1 × 1 | 1 × 1 | 1 × 1 |
| Results of Evaluation | Thickness of base material layer (A) | μm | 55 | 50 | 60 |
|  | Heat of crystallization of base material layer (A) | J/cm³ | 37 | 51 | 50 |
|  | Porosity | % | 0 | 0 | 0 |
|  | Surface oxidation treatment | — | Yes | Yes | Yes |
|  | Thickness of strippable paper (C) | μm | 100 | 100 | 100 |
|  | Toner-receiving layer (B1) | — | No | No | No |
|  | Height of curl of label paper (2 min. after printing) | mm | 3 | 32 | 30 |
|  | Electrostatic capacity of label paper | pF/cm² | 8 | 8 | 10 |
|  | Printing quality | Visual observation | A | A | A |
|  | Waterproof strength | Visual observation | A | A | A |

|  |  |  | Example No. | |
|---|---|---|---|---|
|  |  | Unit | Example 24 | Example 25 |
| Blending Components | Composition |  | Comp. [24] | Comp. [20] |
|  | Thermoplastic resin kind 1 | — | PP | PP |
|  | Blending amount | wt % | 20 | 23 |
|  | Kind 2 | — | TPO | TPO |
|  | Blending amount | wt % | 35 | 32 |
|  | Inorganic fine powder/organic filler kind | — | Calcium carbonate A | Calcium carbonate A |
|  | Average particle size or average dispersion particle size | μm | 1.8 | 1.8 |
|  | Blending amount | wt % | 45 | 45 |
| Producing Conditions | Temperature a | ° C. | 140 | 140 |
|  | Temperature b | ° C. | 160 | 160 |
|  | Temperature c | ° C. | 165 | 165 |
|  | Stretching | — | Biaxial stretching | Biaxial stretching |
|  | Magnification of stretching | time | 5 × 8 | 5 × 8 |
| Results of Evaluation | Thickness of base material layer (A) | μm | 65 | 60 |
|  | Heat of crystallization of base material layer (A) | J/cm³ | 44 | 46 |
|  | Porosity | % | 50 | 35 |
|  | Surface oxidation treatment | — | Yes | Yes |
|  | Thickness of strippable paper (C) | μm | 100 | 100 |
|  | Toner-receiving layer (B1) | — | No | Yes |
|  | Height of curl of label paper (2 min. after printing) | mm | 17 | 10 |
|  | Electrostatic capacity of label paper | pF/cm² | 8 | 9 |
|  | Printing quality | Visual observation | A | A |
|  | Waterproof strength | Visual observation | A | A |

|  |  |  | Example No. | | |
|---|---|---|---|---|---|
|  |  | Unit | Comparative Example 10 | Comparative Example 11 | Comparative Example 12 |
| Blending Components | Composition |  | Comp. [6] | Comp. [25] | Comp. [25] |
|  | Thermoplastic resin kind 1 | — | PP | PP | PP |
|  | Blending amount | wt % | 100 | 55 | 55 |
|  | Kind 2 | — | — | TPO | TPO |
|  | Blending amount | wt % | 0 | 15 | 15 |
|  | Inorganic fine powder/organic filler kind | — | — | Calcium carbonate A | Calcium carbonate A |
|  | Average particle size or average dispersion particle size | μm | — | 1.8 | 1.8 |
|  | Blending amount | wt % | 0 | 30 | 30 |
| Producing Conditions | Temperature a | ° C. | — | 140 | 140 |
|  | Temperature b | ° C. | — | 160 | 160 |
|  | Temperature c | ° C. | — | 165 | 165 |

TABLE 6-continued

| | | | Non-stretching | Biaxial stretching | Biaxial Stretching |
|---|---|---|---|---|---|
| | Stretching | — | Non-stretching | Biaxial stretching | Biaxial Stretching |
| | Magnification of stretching | time | 1 × 1 | 5 × 8 | 5 × 8 |
| Results of Evaluation | Thickness of base material layer (A) | μm | 60 | 65 | 65 |
| | Heat of crystallization of base material layer (A) | J/cm$^3$ | 85 | 66 | 66 |
| | Porosity | % | 0 | 28 | 28 |
| | Surface oxidation treatment | — | Yes | Yes | Yes |
| | Thickness of strippable paper (C) | μm | 100 | 100 | 250 |
| | Toner-receiving layer (B1) | — | No | No | No |
| | Height of curl of label paper (2 min. after printing) | mm | Cylindrical | 63 | 58 |
| | Electrostatic capacity of label paper | pF/cm$^2$ | 9 | 6 | 4 |
| | Printing quality | Visual observation | A | B | C |
| | Waterproof strength | Visual observation | A | A | A |

Example 26

<Resin Film (A)>

Composition [26] obtained by blending 20 wt % of calcium carbonate C (shown in Table 1) with a mixture comprising 6 wt % of PP (shown in Table 1) and 74 wt % of HSBR (shown in Table 1) was kneaded with an extruder set at 250° C., extruded in the state of strands, and cut to prepare pellets. Composition [26] was extruded in the state of a film from T die connected to the extruder set at 250° C., and cooled by a cooling unit, thereby non-stretched film was obtained (thickness: 100 μm, heat of crystallization: 6 J/cm$^3$).

Both surfaces of the film were subjected to corona discharge treatment at applied energy density of 100 W·min/m$^2$.

The obtained resin film (A) was provided with heat-sensitive recording layer (B2) by the same procedure as in Example 9, thus recording paper was obtained.

<Formation of Adhesive Layer (E) and Sticking of Strippable Paper (F)>

Adhesive layer (E) was formed and strippable paper (F) was stuck on the opposite side to the obtained heat-sensitive recording layer (B2) of recording paper by the same procedure as in Example 18, thereby obtaining label paper of the invention.

The obtained label paper was evaluated with the same points as in Example 9. The results obtained are shown in Table 7 below.

Example 27

A non-stretched film was prepared by the same procedure as in Example 26 with composition [27] shown in Table 7. The non-stretched film was heated at 145° C. (temperature a), and then stretched 5 times in the longitudinal direction to thereby obtain a stretched film (thickness: 50 μm, heat of crystallization 43 J/cm$^3$). Thereafter, label paper was manufactured by the same procedure as in Example 26, and evaluated. The results obtained are shown in Table 7 below.

Example 28

Label paper was manufactured by the same procedure as in Example 27 except that composition [28] shown in Table 7 was used. Evaluation was performed in the same manner, and the results obtained are shown in Table 7.

Example 29

A non-stretched film was prepared by the same procedure as in Example 26 with composition [29] as shown in Table 7. The non-stretched film was heated at 140° C. (temperature a), and then stretched 5 times in the longitudinal direction to obtain a stretched film.

Composition [29] was extruded in the state of a film from T die connected to an extruder set at 240° C. The obtained film was laminated on both surfaces of the above-prepared 5-time stretched film. The laminate was cooled to 55° C., heated at 160° C. (temperature b), and then stretched 8 times in the transverse direction with a tenter. Thereafter, the laminate was subjected to annealing at 165° C. (temperature c), cooled to 50° C., and the border was slit, thus a film having a three-layer structure (uniaxial stretching/biaxial stretching/uniaxial stretching) was obtained (thickness: 50 μm, heat of crystallization: 45 J/cm$^3$). Subsequently, label paper was manufactured by the same procedure as in Example 26, and evaluated. The results obtained are shown in Table 7 below.

Example 30

Non-stretched film was prepared by using composition [30] shown in Table 7. Multistage dies connected with two different extruders set at 250° C. were used. Composition [30] was extruded from the multistage dies in the state of film laminated in three-layer structure. The extruded film was cooled with a cooling unit, thereby obtaining a non-stretched film.

The non-stretched film was heated at 140° C. (temperature a), and then stretched 5 times in the longitudinal direction and cooled to obtain a stretched film.

The film was again heated at 160° C. (temperature b), and then stretched 8 times in the transverse direction with a tenter. Thereafter, the film was subjected to annealing at 165° C. (temperature c), cooled to 50° C., and the border was slit, and a film having a three-layer structure (biaxial stretching/biaxial stretching/biaxial stretching) was obtained (thickness: 50 μm, heat of crystallization: 41 J/cm$^3$). Subsequently, label paper was manufactured by the same procedure as in Example 26, and evaluated. The results obtained are shown in Table 7 below.

Comparative Example 13

Label paper was manufactured by the same procedure as in Example 26 except that composition [6] shown in Table 7 was used. Evaluation was performed in the same manner, and the results obtained are shown in Table 7.

TABLE 7

| | | Unit | Example No. | | |
|---|---|---|---|---|---|
| | | | Example 26 | Example 27 | Example 28 |
| Blending Components | Composition | — | Comp. [26] | Comp. [27] | Comp. [28] |
| | Thermoplastic resin kind 1 | — | PP | PP | PP |
| | Blending amount | wt % | 6 | 0 | 0 |
| | Kind 2 | — | HSBR | TPO | TPO |
| | Blending amount | wt % | 74 | 80 | 70 |
| | Inorganic fine powder/organic filler kind | — | Calcium carbonate C | PBT | Calcium carbonate C |
| | Average particle size or average dispersion particle size | μm | 1.5 | 2.0 | 1.5 |
| | Blending amount | wt % | 20 | 20 | 30 |
| Producing Conditions | Temperature a | °C. | — | 145 | 145 |
| | Temperature b | °C. | — | — | — |
| | Temperature c | °C. | — | — | — |
| | Stretching | — | Non-stretching | Uniaxial stretching | Uniaxial stretching |
| | Magnification of stretching | time | 1 × 1 | 1 × 5 | 1 × 5 |
| Results of Evaluation | Thickness of base material layer (A) | μm | 50 | 50 | 50 |
| | Heat of crystallization of base material layer (A) | J/cm$^3$ | 6 | 43 | 35 |
| | Porosity | % | 0 | 8 | 12 |
| | Surface oxidation treatment | — | Yes | Yes | Yes |
| | Thickness of strippable paper (F) | μm | 100 | 100 | 100 |
| | Heat-sensitive recording layer (B2) | — | Yes | Yes | Yes |
| | Height of curl of label paper (2 min. after printing) | mm | 0 | 13 | 0 |
| | Printing quality | Visual observation | B | A | A |
| | Waterproof strength | Visual observation | A | A | A |

| | | Unit | Example No. | | |
|---|---|---|---|---|---|
| | | | Example 29 | Example 30 | Comparative Example 13 |
| Blending Component | Composition | — | Comp. [29] | Comp. [30] | Comp. [6] |
| | Thermoplastic resin kind 1 | — | PP | PP | PP |
| | Blending amount | wt % | 20 | 30 | 100 |
| | Kind 2 | — | TPO | TPO | — |
| | Blending amount | wt % | 40 | 30 | 0 |
| | Inorganic fine powder/organic filler kind | — | Calcium carbonate C | Calcium carbonate C | — |
| | Average particle size or average dispersion particle size | μm | 1.5 | 1.5 | — |
| | Blending amount | wt % | 40 | 40 | 0 |
| Producing Conditions | Temperature a | °C. | 140 | 140 | — |
| | Temperature b | °C. | 160 | 160 | — |
| | Temperature c | °C. | 165 | 165 | — |
| | Stretching | — | Biaxial stretching | Biaxial stretching | Non-stretching |
| | Magnification of stretching | time | 5 × 8 | 5 × 8 | 1 × 1 |
| Results of Evaluation | Thickness of base material layer (A) | μm | 50 | 50 | 50 |
| | Heat of crystallization of base material layer (A) | J/cm$^3$ | 45 | 51 | 85 |
| | Porosity | % | 38 | 40 | 0 |
| | Surface oxidation treatment | — | Yes | Yes | Yes |
| | Thickness of strippable paper (F) | μm | 100 | 100 | 100 |
| | Heat-sensitive recording layer (B2) | — | Yes | Yes | Yes |
| | Height of curl of label paper (2 min. after printing) | mm | 17 | 30 | Cylindrical |
| | Printing quality | Visual observation | A | A | B |
| | Waterproof strength | Visual observation | A | A | A |

While the invention has been described in detail and with reference to specific examples thereof, it will be apparent to one skilled in the art that various changes and modifications can be made therein without departing from the spirit and scope thereof.

The present invention is on the basis of Japanese patent application (Japanese Patent Application No. 2002-077940) filed on Mar. 20, 2002, Japanese patent application (Japanese Patent Application No. 2002-077941) filed on Mar. 20, 2002, Japanese patent application (Japanese Patent Application No. 2002-077942) filed on Mar. 20, 2002, and Japanese patent application (Japanese Patent Application No. 2002-077943) filed on Mar. 20, 2002, the entire contents of each of these are hereby incorporated by reference.

INDUSTRIAL APPLICABILITY

The recording paper and label paper using the same of the present invention can reduce curing after printing with a heat-fixing type electrophotographic printer, a heat-fixing type electrophotographic copier or a direct heat-sensitive printer, and provide good printability in the continuous printing of multiple sheets. The recorded paper and label paper of the present invention has excellent waterproof properties and mechanical characteristics, and are useful as the base materials of indoor and outdoor industrial products. Further, they require no special process to start peeling and a surface layer peels with a light force, so that they can be effectively used in various fields such as delivery slips, masking seals, labels for the prevention of re-covering, labels for the prevention of altering, application seals and coupons.

What is claimed is:

1. A recording film or laminate, comprising:
   a resin film (A) which comprises
      a thermoplastic resin, and
      at least one of an inorganic fine powder and an organic filler,
   wherein the heat of crystallization of said resin film is 60 J/cm$^3$ or lower, wherein said recording film or laminate is for printing with: a heat-fixing type electrophotographic printer; a heat-fixing type electrophotographic copier; or a direct heat-sensitive printer.

2. The recording film or laminate as claimed in claim 1, wherein said resin film (A) comprises from 35 to 97 wt % of a thermoplastic resin and from 65 to 3 wt % of at least one of an inorganic fine powder and an organic filler.

3. The recording film or laminate as claimed in claim 1, wherein the height of curl of the four corners of A-4 size (210 mm×297 mm) paper after two minutes or more from printing with a heat-fixing type electrophotographic printer or a heat-fixing type electrophotographic copier is 50 mm or less on average.

4. The recording film or laminate as claimed in claim 1, wherein the height of curl of the four corners of A-4 size (210mm×297 mm) paper after two minutes or more from printing with a direct heat-sensitive printer is 50 mm or less on average.

5. The recording film or laminate as claimed in claim 1, wherein the thermoplastic resin is selected from the group consisting of a crystalline resin, an amorphous resin, an elastomer and mixtures thereof.

6. The recording film or laminate as claimed in claim 5, wherein the thermoplastic resin is a mixture of a crystalline resin and an amorphous resin, or a mixture of a crystalline resin and an elastomer.

7. The recording film or laminate as claimed in claim 5, wherein the crystalline resin is an olefin resin.

8. The recording film or laminate as claimed in claim 7, wherein the olefin resin is a propylene resin.

9. The recording film or laminate as claimed in claim 5, wherein the amorphous resin is selected from the group consisting of terpene resins, carboxylic acid vinyl ester resins, acrylic esters, methacrylic esters, petroleum resins and mixtures thereof.

10. The recording film or laminate as claimed in claim 5, wherein the elastomer is selected from the group consisting of thermoplastic styrene elastomers, thermoplastic olefin elastomers, thermoplastic urethane elastomer, thermoplastic ester elastomers and mixtures thereof.

11. The recording film or laminate as claimed in claim 1, wherein said resin film (A) has a multilayer structure.

12. The recording film or laminate as claimed in claim 1, wherein said resin film (A) is at least uniaxially stretched.

13. The recording film or laminate as claimed in claim 12, wherein the porosity of said resin film (A) is 75% or less.

14. The recording film or laminate as claimed in claim 1, further comprising a thermoplastic film.

15. The recording film or laminate as claimed in claim 1, wherein at least one side of said resin film (A) is subjected to oxidation treatment and/or provided with an image-receiving layer (B).

16. The recording film or laminate as claimed in claim 1, wherein a layer (C) capable of layer-from-layer peeling having a peeling strength of from 5 to 150 g/cm width is provided on resin film (A).

17. The recording film or laminate as claimed in claim 16, wherein said layer (C) capable of layer-from-layer peeling is provided according to a coating process.

18. The recording film or laminate as claimed in claim 16, wherein a surface layer (D) having a breaking strength of 500 g/cm width or less is provided on the surface of layer (C) capable of layer-from-layer peeling.

19. The recording paper film or laminate as claimed in claim 1, wherein said recording paper film or laminate has a electrostatic capacity of 5 pF/cm$^2$ or more.

20. A label paper, comprising:
   the recording film or laminate as claimed in claim 1, which is laminated with a strippable paper (F) through an adhesive layer (E).

21. A recording substance, comprising:
   the label paper as claimed in claim 20.

22. A method of effective printing, comprising:
   recording on the lable paper as claimed in claim 20, with: a heat-fixing type electrophotographic printer, a heat fixing the electrophotographic copier; or a direct heat-sensitive printer.

23. A recording substance, comprising:
   the recording film or laminate as claimed in claim 1.

24. A method of effective printing, comprising:
   recording on recording film or laminate as claimed in claim 1 with: a heat-fixing type electrophotographic printer; a heat-fixing type electrophotographic copier; or a direct heat-sensitive printer.

* * * * *